(12) United States Patent
Bashar et al.

(10) Patent No.: US 9,680,678 B2
(45) Date of Patent: Jun. 13, 2017

(54) COMMUNICATION SYSTEMS AND METHODS

(71) Applicant: INTEL IP CORPORATION, Santa Clara, CA (US)

(72) Inventors: Shafi Bashar, Santa Clara, CA (US); Seunghee Han, Cupertino, CA (US); Huaning Niu, Milpitas, CA (US); Christian Ibars Casas, Santa Clara, CA (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/581,938

(22) Filed: Dec. 23, 2014

(65) Prior Publication Data

US 2015/0373682 A1    Dec. 24, 2015

Related U.S. Application Data

(60) Provisional application No. 62/016,006, filed on Jun. 23, 2014.

(51) Int. Cl.
*H04W 4/00* (2009.01)
*H04L 27/26* (2006.01)
*H04L 5/00* (2006.01)
*H04W 16/16* (2009.01)
*H04W 48/16* (2009.01)
*H04W 72/00* (2009.01)

(52) U.S. Cl.
CPC ........ *H04L 27/2601* (2013.01); *H04L 5/0005* (2013.01); *H04L 5/0058* (2013.01); *H04W 16/16* (2013.01); *H04W 48/16* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 2006/0285479 A1* | 12/2006 | Han | H04B 7/0678 370/203 |
| 2010/0029216 A1 | 2/2010 | Jovicic et al. | |
| 2012/0257522 A1* | 10/2012 | Adachi | H04W 76/048 370/252 |
| 2014/0023022 A1 | 1/2014 | Cheng et al. | |
| 2014/0120941 A1* | 5/2014 | Cook | H04W 84/105 455/454 |
| 2014/0162601 A1* | 6/2014 | Kim | H04W 12/06 455/411 |
| 2015/0146645 A1 | 5/2015 | Sergeyev et al. | |

(Continued)

OTHER PUBLICATIONS

Korean Intellectual Property Office; International Search Report and Written Opinion for PCT App. No. PCT/US2015/033392; dated Jul. 8, 2015; 10 pages.

(Continued)

*Primary Examiner* — Afshawn Towfighi
(74) *Attorney, Agent, or Firm* — Schwabe, Williamson & Wyatt, P.C.

(57) ABSTRACT

Methods and apparatuses for communicating in a wireless network include methods and systems for producing a discovery signal for use in cellular context using unlicensed spectrum having contiguous resource elements in the time domain.

18 Claims, 17 Drawing Sheets

(56) References Cited

U.S. PATENT DOCUMENTS

2016/0211957 A1* 7/2016 Kenney ................ H04W 24/00
2016/0283428 A1 9/2016 Guddeti

OTHER PUBLICATIONS

3GPP TS 36.104, V12.0.0 (Jul. 2013); 3rd Generation Partnership Project; Technical Specification Group Radio Access Network; Evolved Universal Terrestrial Radio Access (E-UTRA); Base Station (BS) Radio Transmission and Reception (Release 12); 139 pages.
Huawei, Hisilicon; "New L1 procedure for small cell on/off transition time further reduction," 3GPP TSG RAN WG1 Meeting #77 R1-141918; Agenda Item: 6.2.3.2.1; Seoul, Korea, May 19-23, 2014; 6 pages.
Mediatek Inc.; "Layer-1 procedure enhancements for fast small cell on/off operation," 3GPP TSG-RAN WG1 #77 R1-142298; Agenda Item: 6.2.3.2.1; Seoul, Korea, May 19-May 23, 2014; 7 pages.
Ericsson, Panasonic, NTT DoCoMo, Fujitsu, LG Electronics; "WF on small cell on/off transition time reduction for SCells," R1-142690; Agenda 6.2.3.2.1; May 21, 2014; 2 pages.
NSN, Nokia, Broadcom, Motorola Mobility, NVIDIA . . . ; "Way Forward on New L1 Procedure for Small Cell On/Off," R1-142695 RAN1 #77; Seoul, Korea, May 19-23; 2 pages.
Ericsson; "WF on small cell on/off transition time reduction for SCells," R1-142722, Agenda 6.2.3.2.1; May 22, 2016; 3 pages.
MCC Support; "Final Report of 3GPP TSG RAN WG1 #77 v1.1.0 (Seoul, South Korea, May 19-23, 2014)," 3GPP TSG RAN WG1 Meeting #78 R1-143404; Dresden, Germany, Aug. 18-22, 2014; 106 pages.

* cited by examiner

300

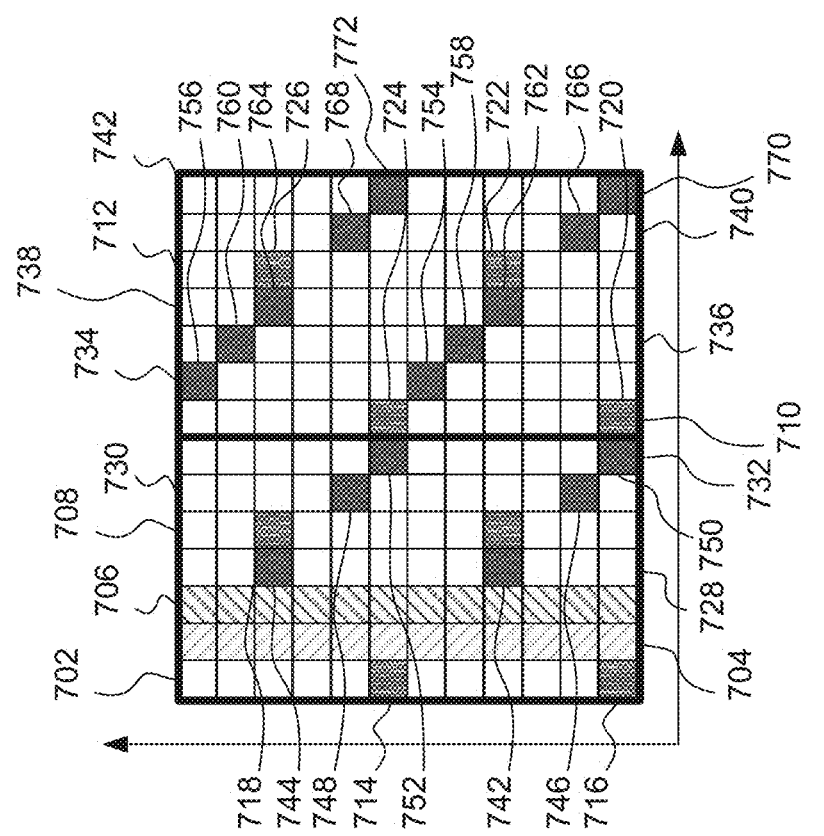

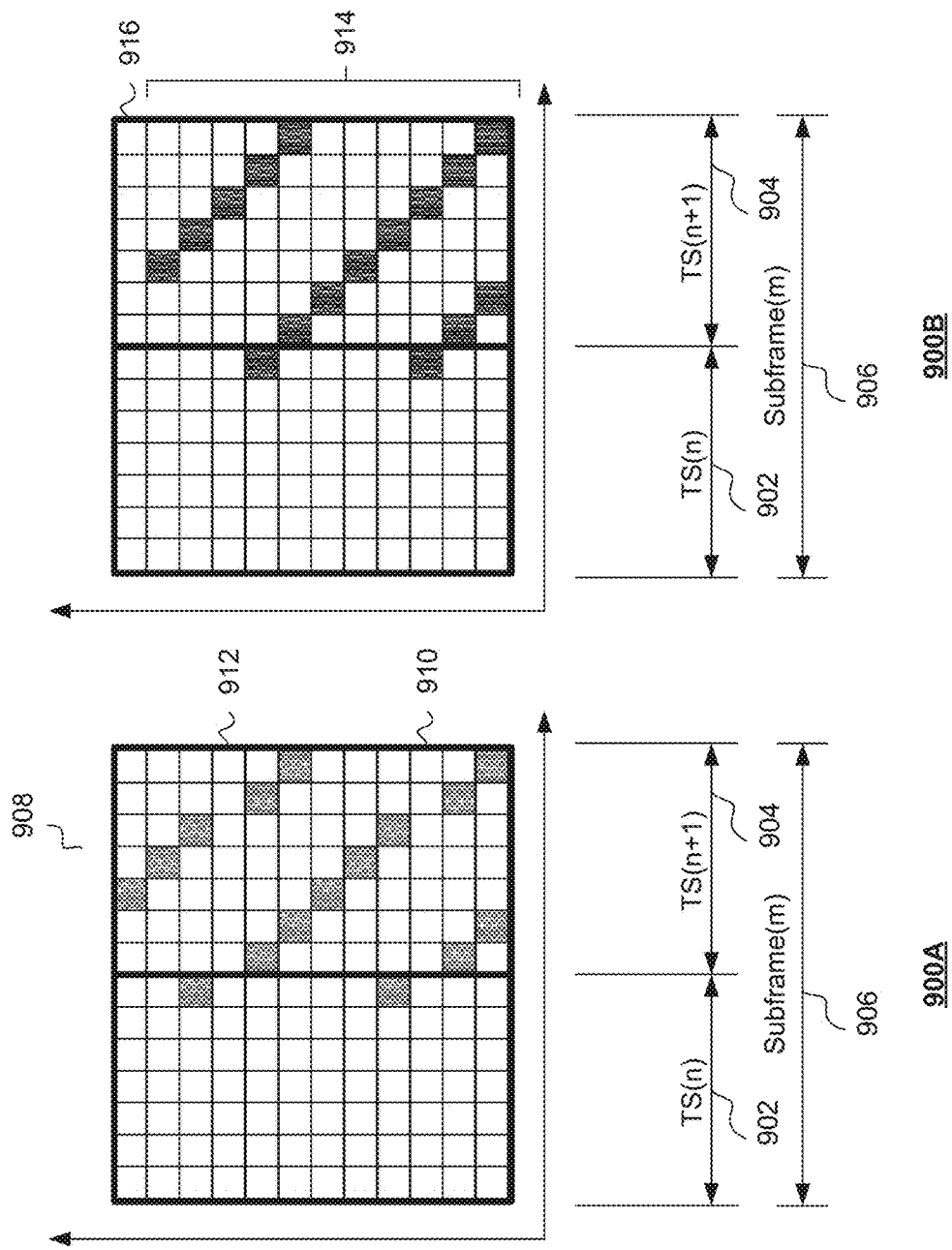

COMMUNICATION SYSTEMS AND METHODS

BACKGROUND OF THE INVENTION

The development of the next generation of wireless mobile communications for 5G cellular communication is underway. With spectrum always being at a premium, engineers are turning to millimeter wave frequencies to provide those next generation services.

However, while the above spectrum is presently unused and can be used to realise multi-gigabit wireless communications, it is well-known within the art that electromagnetic waves at these frequencies suffer from high attenuation and high path loss, which, consequently, limits the cell sizes that can be realised.

Various techniques exist for addressing the path loss, which include using one or more than one diversity technique, such as, for example, spatial diversity/multiplexing, in which two or more different transmit signals are used to increase overall throughput, and beam forming, in which two or more instances of the same signal are used to improve communication reliability.

Nevertheless, millimeter waves present several beam forming technical challenges that comprise, firstly, delay spread and angular spread, which are particularly problematical under Non-Line Of Sight (NLOS) conditions such as found indoors, and, secondly, beam misalignment, which arises when channel state information or beam tracking is inaccurate due to, for example, at least one or more of measurement errors and user equipment mobility.

BRIEF DESCRIPTION OF THE DRAWING

Aspects, features and advantages of embodiments of the present invention will become apparent from the following description of the invention in reference to the appended drawing in which like numerals denote like elements and in which:

FIGS. 7A and 7B depict discovery signals according to embodiments;

FIGS. 9A and 9B illustrate discovery signals according to embodiments;

DETAILED DESCRIPTION OF THE INVENTION

Figure 1:
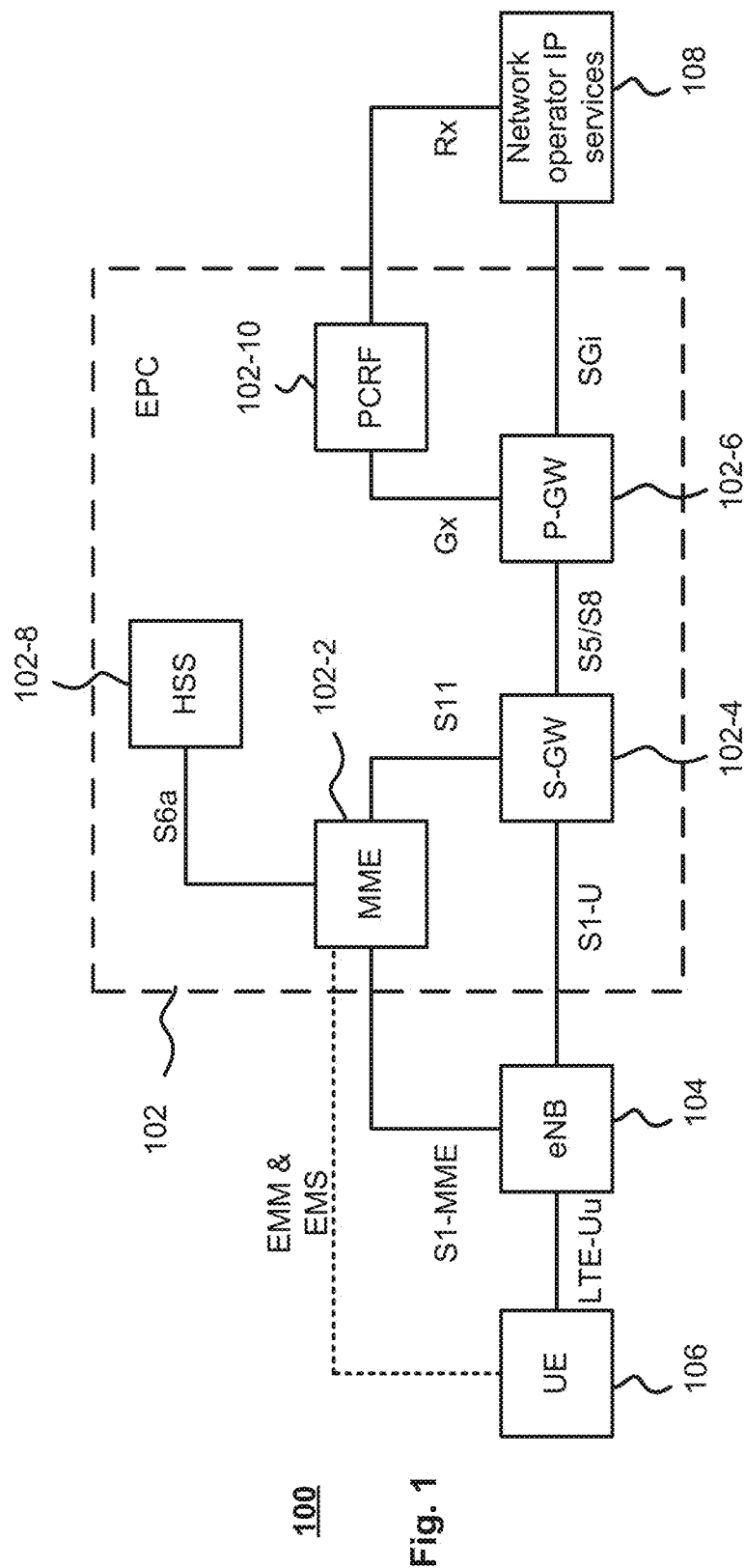
FIG. 1 shows an Evolved Packet System.

FIG. 1 shows an Evolved Packet System (EPS) 100, that is, an E-UTRAN. The EPS 100 can comprise an Evolved Packet Core (EPC) 102, an eNode B (eNB) 104, a user equipment (UE) 106 and an operator packet data network 108.

The EPC 102 has a mobile management entity (MME) 102-2. The EPC 102 also comprises a serving gateway (S-GW) 102-4 and a packet data network gateway (P-GW) 102-6. The S-GW 102-4 is operable to exchange packets with the eNB 104 that is serving the UE 106. The S-GW 102-4 operates, in effect, as a router supporting data exchange between the UE 106 and the P-GW 102-6. The P-GW 102-6 serves as a gateway to external packet data networks such as, for example, network 108. The P-GW 102-6 also performs other functions such as address allocation, policy enforcement, packet filtering and routing. It can be appreciated that the packet data network gateway 102-6 communicates with the external packet data networks via an SGi interface.

The MME 102-2 performs signaling such that data packets do not pass through the MME 102-2, which decouples data from signaling to support developing capacity for signaling and data separately. The MME 102-2 is operable to control many aspects of UE 106 engagement such as, for example, paging the UE 106, tracking area management, authentication, gateway selection, roaming, security and the like.

The eNB 104 is responsible for providing the air interface, LTE-Uu, via which the UE 106 can transmit and receive packets. The eNB 104 performs various functions such as, for example, admission control to allow the UE 106 access to the EPS 100 and radio resource management.

The eNB 104 and the MME 102-2 communicate via an S1-MME interface. Optionally, and not shown, the eNB 104 can be connected to one or more other eNBs either directly via an X2 interface or indirectly via the S1-MME interface.

The eNB 104 is an embodiment of a set of eNodeB or transmit points. Such a set of eNodeBs or transmit points can comprise one or more than one eNodeB or transmit point. Since the eNB 104 is illustrated as serving the UE 106, it is said to be an active eNodeB or transmit point. Therefore, the eNB 104 is an embodiment of a set of active eNodeBs or transmit points. Such a set of active eNodeBs or transmit points can comprise one or more than one active eNodeB or transmit point. Conversely, if eNB 104 was not serving the UE 106, or any other UE, it would be said to be an inactive eNodeB or transmit point such that the eNB 104 would be an embodiment of a set of inactive eNodeB or transmit points. Such a set of inactive eNodeBs or transmit points can comprise one or more than one inactive eNodeB or transmit point. Typically, a network, such as a mobile network, has a set of eNodeBs or transmit points comprising a set of active eNodeBs or transmit points and a set of inactive eNodeBs or transmit points. One skilled in the art understands that an eNB can be a species of the genus "eNodeB or transmit points" and that embodiments of the present invention can be implemented or realised using one or more than one eNodeB or transmit point.

The EPC 102 comprises a home subscriber server (HSS) 102-8. The HSS 102-8 is a centrally accessible database containing subscriber data associated with one or more than one UE such as, for example, the UE 106.

One skilled in the art appreciates that the various interfaces described above are implemented to exchange data between the UE 106 and the P-GW 102-6 using user plane protocols such as, for example, GPRS tunneling protocol user part (GTP-U), and, for example, Generic Routing Encapsulation (GRE); the latter can be used to realise the S5/S8 interface.

The EPS 100 can use a plurality of signaling protocols. Air interface signaling, via which the eNB 104 influences or otherwise controls the radio resources used by the UE 106, is realised using a radio resource control (RRC) protocol. The S1-MME link or interface is realised using the S1 application protocol (S1-AP).

The MME 102-2 can control the UE 106 using two air interface non access stratum protocols, which are the EPS session management (ESM) protocol, which controls data streams associated with the external packet data network 108, and the EPS mobility management (EMM) protocol, which manages the internal operation of the EPC 102. EMM and EMS messages are exchanged with the UE 106 using RRC and S1-AP messages using the S1-MME and LTE-Uu interfaces.

The S11 interface signaling and the S5/S8 interface signaling are implemented using the GPRS tunneling protocol control part (GTP-C).

The EPC 102 can also comprise a Policy Control Rule Function (PCRF) network entity 102-10. The PCRF 102-10 is responsible for establishing a number of performance objectives. Examples of the performance objectives can comprise at least one of quality of service (QoS) and charging goals for each session based on a respective or committed service level per UE and service type.

Figure 2:
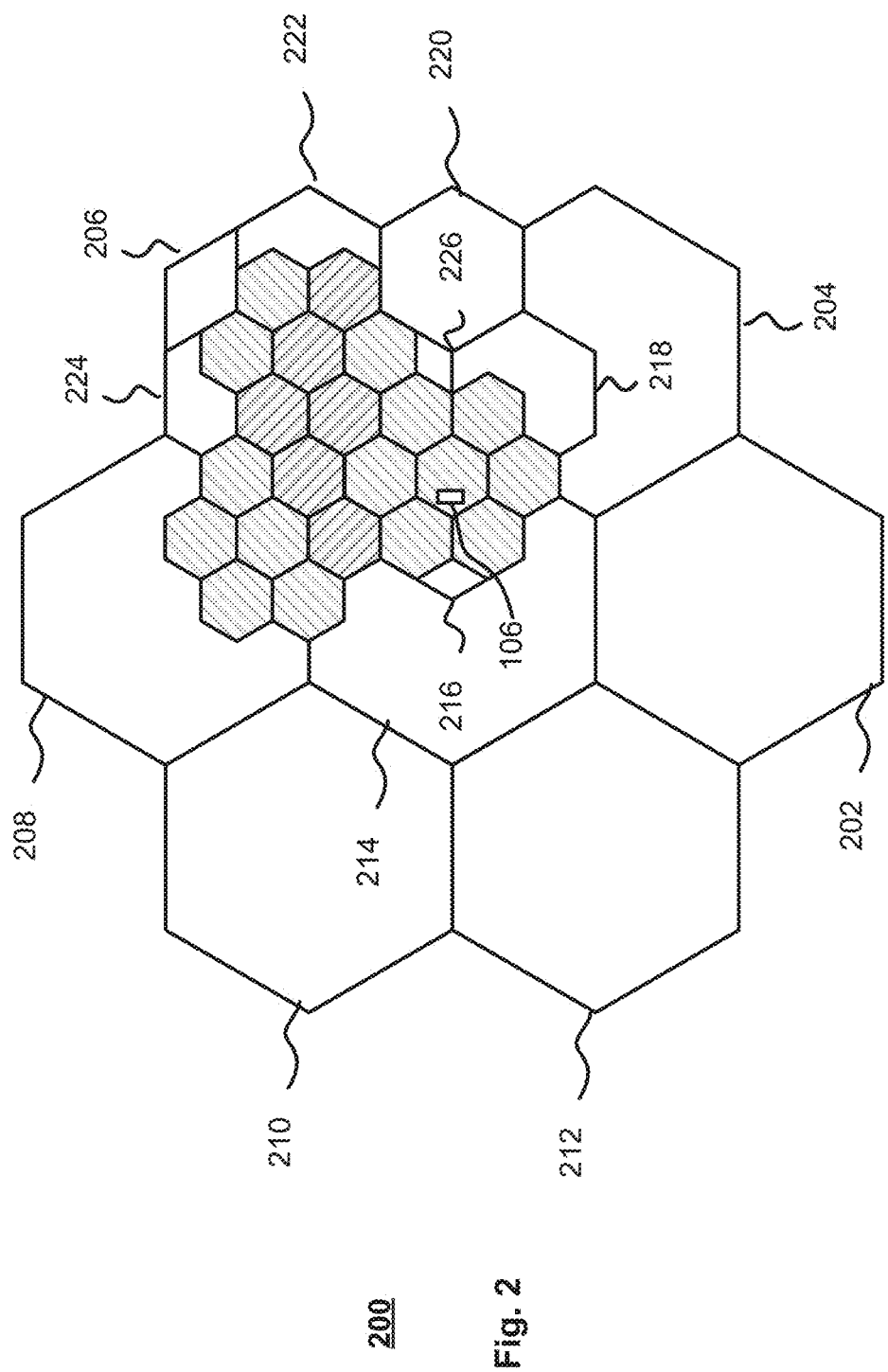
FIG. 2 illustrates a first view of a cellular system.

Referring to FIG. 2, there is shown a view of a cellular system 200 provided by a number of eNBs (not shown) of respective cells. The eNBs can be an eNB such as the eNB 104 described above. In the illustrated embodiment, the cellular system 200 comprises multiple eNodeB classes, which, in turn, define respective cell classes or cell sizes. It will be appreciated that an eNB such as the above-described eNB 104 is an embodiment of an eNodeB or transmit point. The eNodeB classes can be defined with respect to one or more than one predetermined parameter. Embodiments are provided in which the predetermined parameter is associated with an eNodeB's transmit power. Embodiments are provided in which the predetermined parameter is a rated output power, PRAT, of an eNodeB, which is the mean power level per carrier for an eNodeB operating in single carrier, multi-carrier or carrier aggregation configurations available at an antenna connector during a transmitter ON period. Also shown in FIG. 2 is the UE 106.

Although the embodiments described herein define base station, that is, eNB or transmit point, classes with reference to respective PRATs, any and all embodiments can be realised using some other definition. For example, the base stations could equally well be, alternatively or additionally, defined with reference to a minimum coupling loss between the base station and a user equipment. For example, section 4.2, TS 36.104, V12.0.0 defines Wide Area Base Stations, Medium Range Base Stations, Local Area Base Stations and Home Base Stations according to respective coupling loses. A wide area base station is characterized by a base station to user equipment coupling loss of a predetermined number of dBs, such as, for example, 70 dBs. A medium range base station is characterized by a respective coupling loss such as, for example, 53 dBs. A local area base station is characterized by a base station to user equipment loss of 45 dBs.

It will be appreciated that different PRATs can be defined for different eNodeBs or transmit points. Embodiments are provided in which the rated output power, PRAT, of the eNBs forming the cellular system 200 correspond to wide area eNodeBs or transmit points having no upper PRAT limit, medium range eNodeBs or transmit points having an upper PRAT limit of less than or equal to a first respective level, such as, for example, +38 dBm, local area eNodeBs or transmit points having an upper PRAT limit of a second respective level such as, for example, +24 dBm, and a home eNodeBs or transmit points having an upper PRAT limit of less than or equal to at least a third respective level such as, for example, +20 dBm for a first respective number, such as, for example, one, of transmit antenna ports, less than or equal to +17 dBm for a second respective number, such as, for example, two, of transmit antenna ports, +14 dBm for a third respective number such as, for example, four, of transmit antenna ports and +11 dBm for a fourth respective number such as, for example, eight, of transmit antenna ports.

In FIG. 2, a number of larger cells 202 to 214 are provided. In the illustrated embodiment, eight such larger cells 202 to 214 are provided. The larger cells 202 to 214 correspond to eNBs that can be classified as wide area eNodeBs. A number of smaller cells 216 to 226 are provided. In the illustrated embodiment, six such smaller cells 216 to 226 are provided. The smaller cells 216 to 226 correspond to eNBs that can be classified as medium range eNodeBs.

A number of still smaller cells is also provided. In the illustrated embodiment, twenty-one such still smaller cells are provided. The still smaller cells correspond to eNBs that are classified as at least one of local area eNodeBs and home eNodeBs and will generally be referred to as small cells. The small cells provided by respective eNBs, that is, base stations, are shown in greater detail in FIG. 3.

Figure 3:
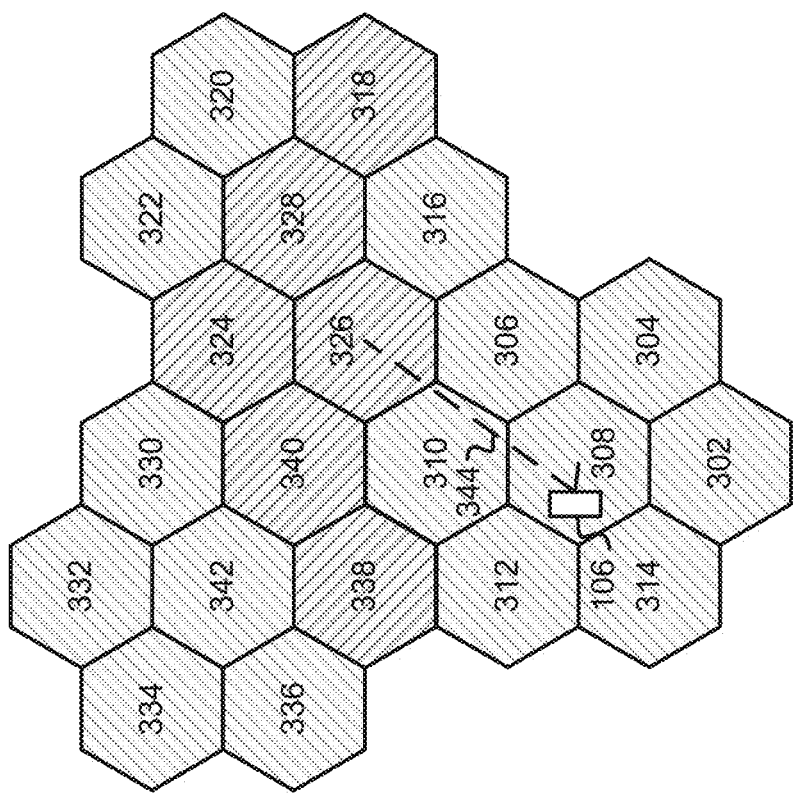
FIG. 3 depicts a view of Small Cells of the cellular system of FIG. 2.

FIG. 3 shows a view 300 of the small cells 302 to 342. In the embodiment illustrated the still smaller cells can be grouped into cell patterns, with cells 302 to 314 forming a first cell pattern comprising a respective number of cells, cells 316 to 328 forming a second cell pattern comprising a respective number of cells and cells 330 to 342 forming a third cell pattern comprising a respective number of cells. In the illustrated embodiment the first to third cell patterns are formed from a repeated seven-cell pattern. In the illustrated embodiment, the still smaller cells have eNBs corresponding to the home base station class of base stations. Although the embodiment uses a common repeating cell pattern, embodiments are not limited thereto. Embodiments can be realised in which the still smaller cells do not form a cell pattern. Alternatively, or additionally, embodiments can be realised in which the first to third cell patterns are different rather than being a repeating cell-pattern and, in particular, rather than being a seven-cell cell pattern.

One or more than one of the small cells 302 to 342 can operate using a predetermined or selectable range of frequencies. For example, one or more of the small cells 302 to 342 can be configured to operate with frequencies that are licensed for cellular use, such as, for example, frequencies licensed for use by LTE-A systems. Similarly, one or more than one cell of the larger cells 202 to 226 can be configured to operate using a predetermined or selectable range of frequencies. For example, one or more of the larger cells 202 to 226 can be configured to operate with frequencies that are licensed for cellular use, such as, for example, frequencies licensed for use by LTE-A systems.

Furthermore, one or more than one of the small cells 302 to 342 can operate using a different predetermined or different selectable range of frequencies. For example, one or more of the small cells 302 to 342 can be configured to operate with frequencies that are not licensed for cellular use, such as, for example, frequencies that are not licensed for use by LTE-A systems. Similarly, one or more than one cell of the larger cells 202 to 226 can be configured to operate using a different predetermined or different selectable range of frequencies. For example, one or more of the larger cells 202 to 226 can be configured to operate with frequencies that are not licensed for cellular use, such as, for example, frequencies not licensed for use by LTE-A systems. Such operation of LTE in such unlicensed spectrum will be referred to as LTE-Unlicensed (LTE-U) or Licensed-Assisted Access (LAA).

Still further, embodiments can be realised in which one or more than one eNB 202 to 342 is configured to use LTE in licensed spectrum and to use LTE in unlicensed spectrum. The use by such an eNB of LTE in licensed spectrum and LTE in unlicensed spectrum can be simultaneous.

The cellular network of FIG. 2 can comprise a mixture of eNBs of any class that are configured to operate using at least one of licensed LTE spectrum or unlicensed spectrum. Therefore, the cellular network of FIG. 2 can comprise one or more than one eNB configured to operate using LTE in unlicensed spectrum and one or more than one eNB configured to use LTE in licensed spectrum.

Embodiments can be realised in which one or more than one eNB of the eNBs 202 to 342 can be configured to carry predetermined classes, types or one or more than one set of signals when using LTE in licensed spectrum. For example, one or more than one eNB of the eNBs 202 to 342 can be configured to carry signalling or data with a prescribed metric such as, for example, a prescribed quality of service. The predetermined classes, types or sets of signals can be associated with at least one of the uplink and downlink. Embodiments can be realised in which one or more than one eNB of the eNBs 202 to 342 can be configured to carry predetermined classes, types or one or more than one set of signals when using LTE in unlicensed spectrum. For example, one or more than one eNB of the eNBs 202 to 342 can be configured to carry data with a prescribed metric such as, for example, a prescribed quality of service.

Still further embodiments can be realised in which at least a pair of eNBs of the eNBs 202 to 342 cooperate or can be operated cooperatively to service one or more than one common user equipment. A first eNB of the pair of eNBs can be configured to operate using LTE in licensed spectrum for a first respective purpose and a second eNB of the pair of eNBs can be configured to operate using LTE in unlicensed spectrum for a second respective purpose. For example, the first respective purpose could be to deliver at least one of signalling and data and the second respective purpose could be to provide supplementary delivery of data. It can be appreciated that such a first, or primary, eNB is being supported by a second, or secondary, eNB. The primary eNB is supported by the secondary eNB by the latter using unlicensed spectrum.

An eNB of such a cell 302 to 342 can have one of a number of predefined states. Embodiments can be realised in which an eNB of a cell has, or is in, at least one of two states. Embodiments can be realised in which an eNB of a cell is in either an ON state or an OFF state. An ON state is defined as a state in which the eNB of the cell is available to serve, or is serving, a user equipment. An eNB can be available to serve a UE by transmitting, for example, a control signal that allows a user equipment to select the eNB of that cell as being a preferred eNB to provide a service to that UE. An ON state is an embodiment of an active state. An eNB in an ON state is an embodiment of an active base station. An OFF state is defined as a state in which the eNB of the cell is not in an ON state. Therefore, an embodiment of an OFF state is a state in which the eNB of the cell is not available to serve a user equipment. An OFF state is an embodiment of an inactive state. An eNB in an OFF state is an embodiment of an inactive base station.

Additionally, or alternatively, an eNB can be in such an OFF state from the perspective of a predetermined or selectable frequency band such as, for example, an unlicensed frequency band. Still further, an eNB can, additionally or alternatively, be in an OFF state insofar as concerns a first predetermined or selected frequency band such as, for example, an unlicensed frequency band that is not licensed for cellular systems, but concurrently be in an ON state insofar as concerns a second predetermined or selectable frequency band such as, for example, a licensed frequency band that is licensed for cellular systems. Embodiments can be realised in which the predetermined or selectable frequency band for the discovery signals or any other LTE signals in unlicensed spectrum comprises millimeter wave frequencies found at 30 GHz to 300 GHz. Embodiments can also be realised in which the predetermined or selectable frequencies for the discovery signals or any other LTE signals in unlicensed spectrum comprise frequencies from and above 28 GHz up to and including the above millimeter wave frequencies. Still further, any of the embodiments can, additionally or alternatively, operate using frequencies of 5 GHz and above for the discovery signals or any other LTE signals in unlicensed spectrum.

Although embodiments have been described with reference to one or more than eNB of the small cell eNBs 302 to 342 being in such an OFF state, embodiments are not limited thereto. Embodiments can, additionally or alternatively, be realised in which one or more than one eNB of the eNBs 202 to 342 can be configured to have such an OFF state.

In the embodiment illustrated, cells 318, 324, 326, 328, 338 and 340 have one or more than one respective eNB that is in an active state. In the illustrated embodiment, all of the remaining cells have one or more than one eNB that is in such an OFF state.

Cell 326 is shown, by virtue of the dashed line 344 connecting the UE 106 and the cell 326, as having an active eNB that is serving the UE 106. A cell is said to be serving a UE when the eNB of that cell is supporting a data transfer or other exchange with the UE 106 or is at least available for such a transfer or other exchange without being in an OFF state.

It can be appreciated that the geographical distribution of the ON cells 318, 326, 328, 338 and 340 is sub-optimal relative to the present network demand. The UE 106 and eNB 104 of the serving cell 326 will both be transmitting at a determined power level appropriate to the separation between them and the channel conditions between them. It can also be appreciated that the overall set of still smaller cells comprises at least two sets of cells, that is, a set of active cells and a set of inactive cells. The set of active cells comprises cells 318, 324, 326, 328, 338 and 340. The set of inactive cells comprises cells 302, 304, 306, 308, 310, 312, 314, 316, 320, 322, 330, 332, 334, 336, 342.

Figure 4:
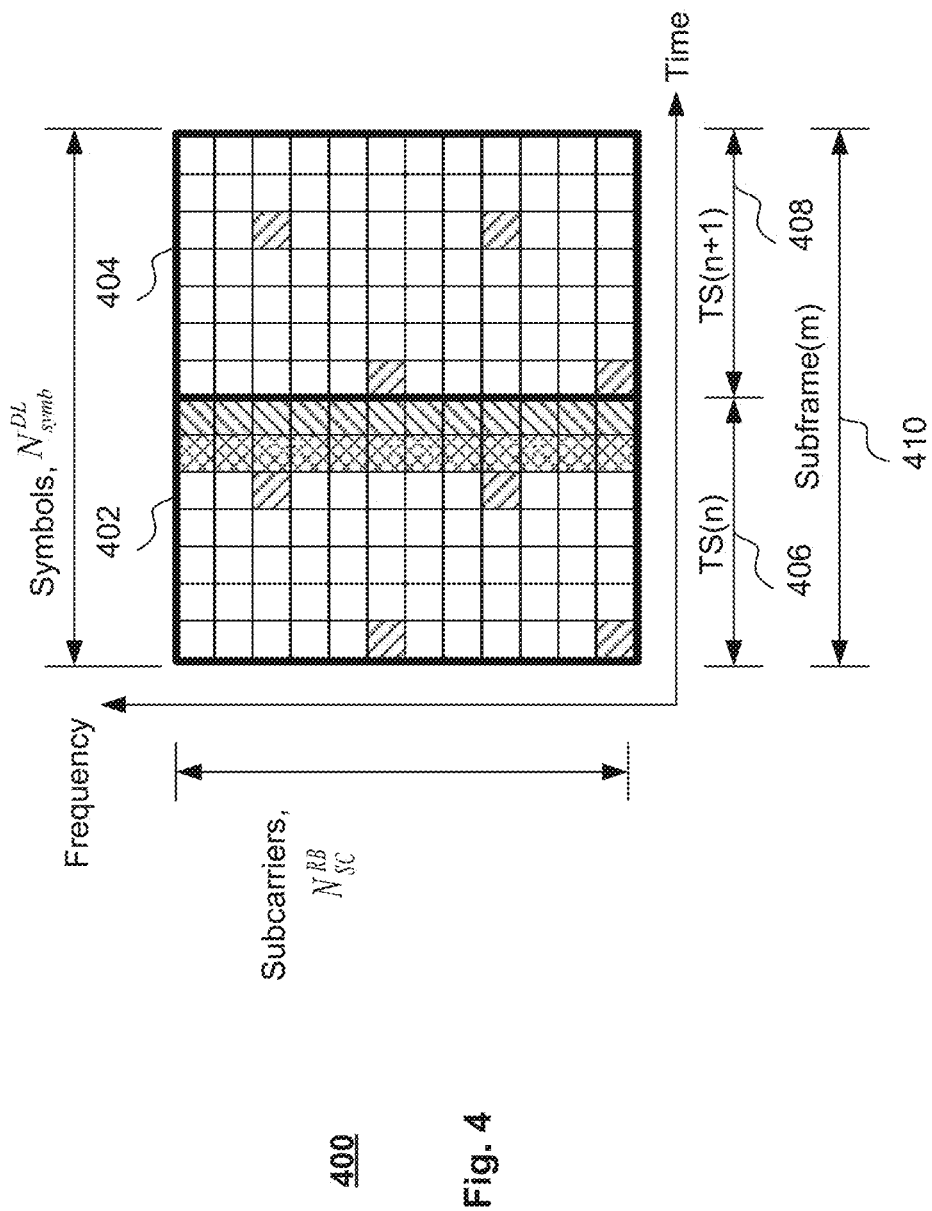
FIG. 4 shows a view of known resource blocks.

FIG. 4 shows a view 400 of two known resource blocks 402 and 404 corresponding to respective time slots 406 and 408 of a subframe 410 of a radio frame (not shown). A resource block comprises a predetermined number of resource elements, according to a predetermined number of subcarriers $N_{SC}^{RB}$ per resource block and according to a predetermined number of OFDM symbols $N_{symb}^{DL}$ per resource block. Therefore, the number of resource elements per resource block is given by $N_{symb}^{DL} N_{SC}^{RB}$ for the downlink. In the embodiment illustrated, it is assumed that there are 7 OFDM symbols per time slot, on the assumption that a normal cyclic prefix is used. It will be appreciated that embodiments can be realised in which some other number of OFDM symbols are used per time slot such as, for example, 6 OFDM symbols in the case of an extended cyclic prefix. The same applies to the uplink where OFDM symbols are replaced by SC-FDMA symbols.

Figure 5A:
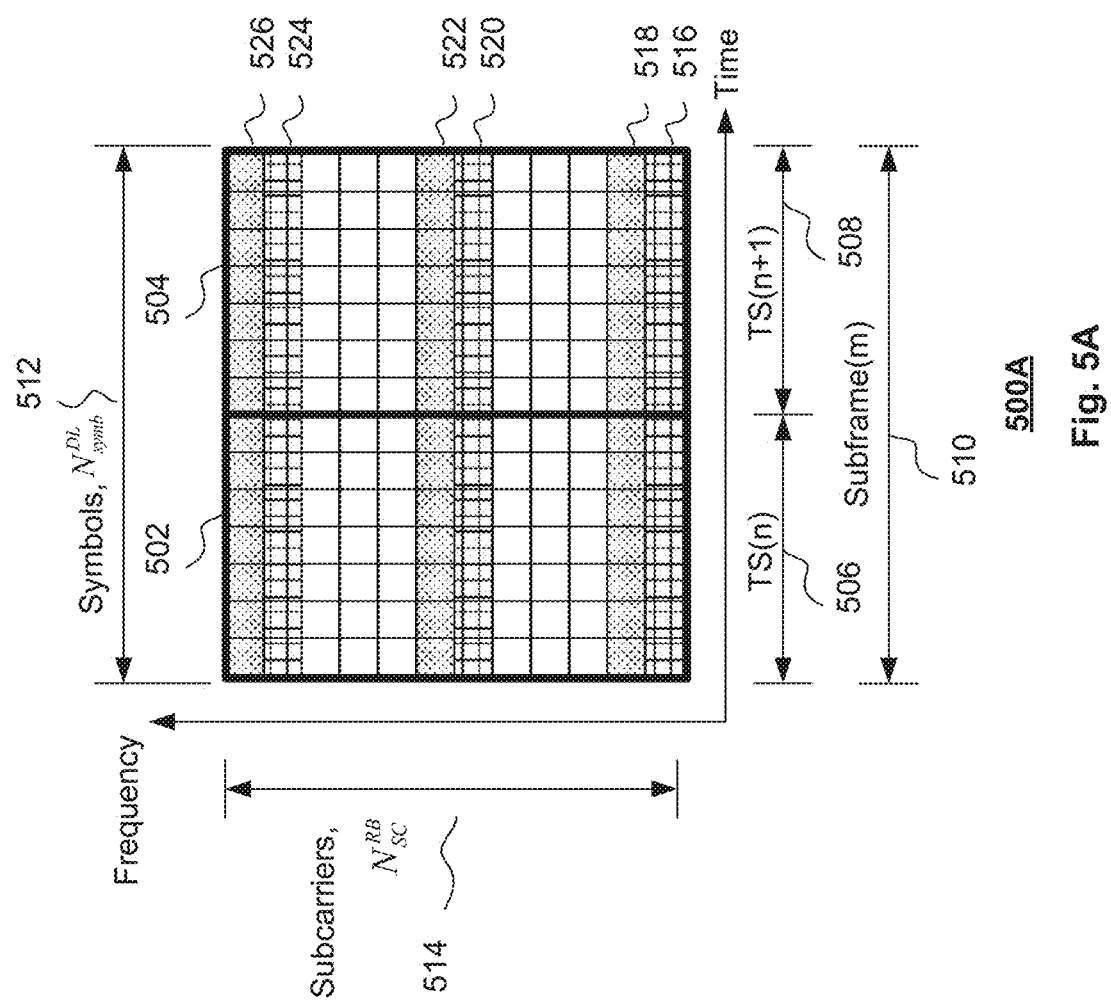
FIGS. 5A and 5B show discovery signals according to embodiments.

FIG. 5A shows a view of a discovery signal 500A according to an embodiment for transmission by an eNB during an OFF state. The signal 500A comprises two resource blocks 502 and 504. In the signal 500A the resource blocks 502 and 504 each correspond to two time slots 506 and 508 of a subframe 510. The time slots are divided, in the time domain, into respective symbols 512. The signal 500A illustrated has seven symbols per time slot. This follows from the signal 500A using normal cyclic prefixes. Alternative embodiments can be realised that use extended cyclic prefixes, which results in six symbols per time slot. Each of the symbols 512 has a respective predetermined number of subcarriers 514. In the signal 500A shown, each symbol has 12 subcarriers. Embodiments can be realised in which the symbols 512 are OFDM symbols. The signal 500A can be applied to the downlink of an LTE-A system. Additionally, or alternatively, embodiments can be realised in which the symbols are SC-FDMA symbols, which could be applied to an uplink of an LTE-A system.

The subcarriers 514 have frequencies that correspond to an unlicensed frequency band, that is, to at least one spectrum that has not been licensed for use by a wireless cellular communication system such as, for example, any of the spectra used for LTE and LTE-A or other LTE-derived standards taken jointly and severally in any and all permutations.

The signal 500A comprises a number of occupied resource elements. An occupied resource element is a resource element that has a signal bearing subcarrier. The signal bearing subcarrier can convey data, signalling or other information or can merely represent a tone that is not intended to convey data, signalling or other information. An occupied resource element operates, in substance, as a reservation token that reserves associated other resource elements, within an unlicensed spectrum, for use in supporting LTE-A communications between the eNB 104 and the user equipment 106. It will be appreciated that other communication systems operating within the unlicensed frequency band, in particular those that use some form of Listen Before Talk, CSMA/CA, CSMA/CD, or other form spectrum sensing prior to transmitting, would detect the occupied resource element, and avoid transmitting within a time period at least associated with the symbol of that occupied resource element, or using the subcarrier corresponding to that resource element, or any other corresponding subcarriers of the symbol associated with that resource element.

In the signal 500A illustrated, it can be appreciated that every symbol 512 of the subframe 510 comprises one or more than one occupied resource element, that is, at least one occupied resource element. In the embodiment of the signal 500A shown in FIG. 5A, it can be appreciated that every symbol 512 comprises at least one occupied resource element.

In one sense, the content of each occupied resource element can be irrelevant. However, embodiments can alternatively or additionally be realised in which one or more than one resource element of the occupied resource elements comprises at least one of identification data such as, for example, a cell-specific reference signal, CRS, either with or without a respective port, synchronization data such as, for example, at least one of a primary (PSS) or secondary synchronization signal (SSS) and positioning data, or any other signal.

In the signal 500A of FIG. 5A, it can be appreciated that there are several instances 516 to 524, across the bandwidth of each symbol, of common subcarriers having respective occupied resource elements.

Figure 5B:
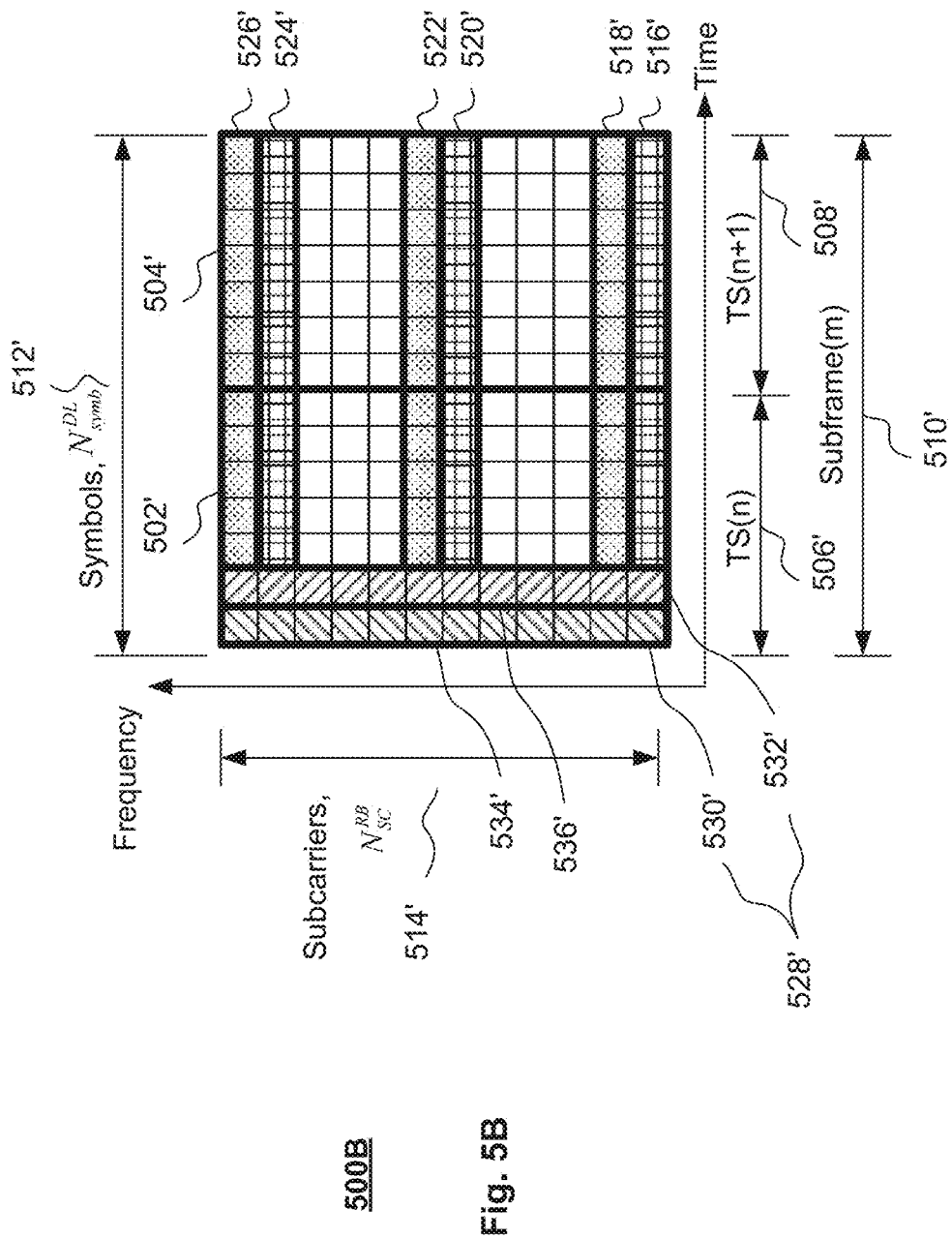

FIG. 5B illustrates a further embodiment of a discovery signal 500B. The signal can be used for supporting LTE in unlicensed spectrum. The signal 500B comprises two resource blocks 502' and 504'. In the signal 500B illustrated the resource blocks 502' and 504' each correspond to respective time slots 506' and 508' of a subframe 510'. The time slots are divided, in the time domain, into respective symbols 512'. The signal 500B has seven symbols per time slots. This follows from the signal 500B using normal cyclic prefixes. Alternative embodiments can be realised that use extended cyclic prefixes, which results in six symbols per time slot. Each of the symbols 512' has a respective predetermined number of subcarriers 514'. In the signal 500B shown, each symbol has 12 subcarriers. Embodiments can be realised in which the symbols 512' are OFDM symbols. The signal 500B illustrated can be applied to the downlink of an LTE-A system. Additionally, or alternatively, embodiments can be realised in which the symbols are SC-FDMA symbols, which could be applied to an uplink of an LTE-A system.

The subcarriers 514' have frequencies that correspond to an unlicensed frequency band, that is, to a spectrum that has not been licensed for use by a wireless cellular communication system such as, for example, any of the spectra used for LTE and LTE-A or other LTE-derived standards taken jointly and severally in any and all permutations.

The signal 500B comprises a number of occupied resource elements. An occupied resource element is a resource element that has a signal bearing subcarrier. The signal bearing subcarrier can convey data, signalling or other information or can merely represent a tone that is not intended to convey data, signalling or other information. An occupied resource element operates, in substance, as a reservation token that reserves associated other resource elements for use in supporting LTE-A communications between the eNB 104 and the user equipment 106. It will be appreciated that other communication systems operating within the unlicensed frequency band, in particular those that use some form of Listen Before Talk, CSMA/CA, CSMA/CD, or other form spectrum sensing prior to transmitting, would detect the occupied resource element, and avoid transmitting within a time period at least associated with the symbol of that occupied resource element, or refrain from using the subcarrier corresponding to that resource element or any other corresponding subcarriers of the symbol associated with that occupied resource element.

In the signal 500B, it can be appreciated that every symbol 512' of the subframe 510' comprises one or more than one occupied resource element, that is, at least one occupied resource element. In the embodiment of the signal 500B shown in FIG. 5B, it can be appreciated that every symbol 512' comprises at least one occupied resource element.

In one sense, the content of each occupied resource element can be irrelevant. However, embodiments can, alternatively or additionally, be realised in which one or more resource element of the occupied resource elements comprises at least one of identification data such as, for example, a cell-specific reference signal, CRS, either with or without a respective port, synchronization data such as, for example, at least one of a primary (PSS) or secondary synchronization signal (SSS) and positioning signals or any other signal.

In the signal 500B of FIG. 5B, it can be appreciated that there are several instances 516' to 524', across the bandwidth of each symbol, of common subcarriers having respective occupied resource elements.

FIG. 5B further comprises at least one legacy portion 528'. The legacy portion 528' is arranged to carry existing LTE-A signals and other signals. In the illustrated embodiment, the legacy portion 528' comprises first and second signals 530' and 532'. Embodiments can be realised in which the first and second signals 530' and 532' are at least one of the Primary and Secondary synchronization signals. It can be seen that a first symbol 534' bears the primary synchronization signal(s) 530' and a second symbol 536' bears the secondary synchronization signal(s). Embodiments can be realised in which the legacy portion 528' comprises some other signal or signals, or a single instance of a synchronization signal or a single instance of some other LTE-A signal.

The embodiment of the signal 500B of FIG. 5B not only reserves resource elements for use in supporting cellular wireless communications within an unlicensed frequency band, but also supports synchronization.

Figure 6A:
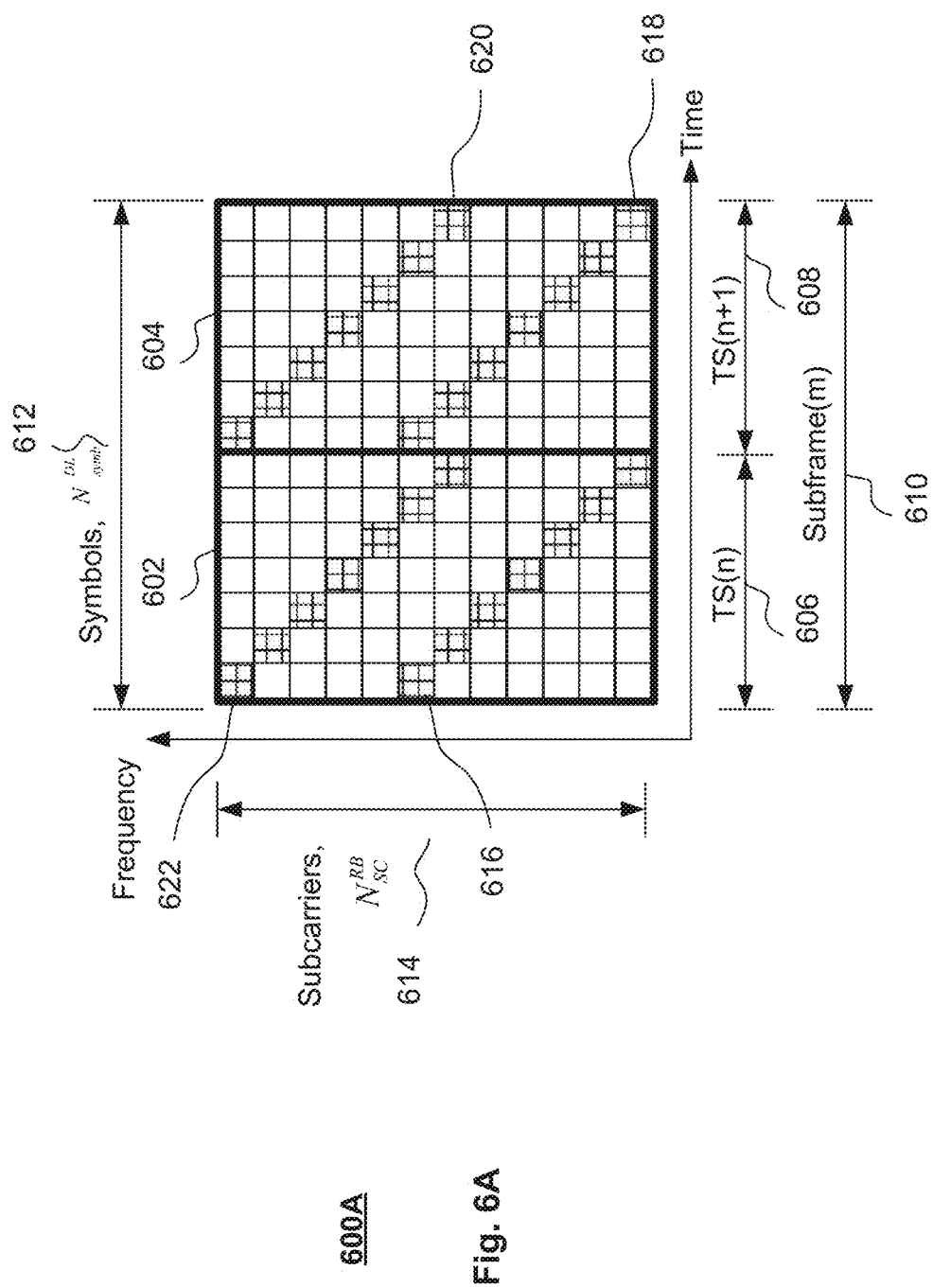
FIGS. 6A and 6B illustrate discovery signals according to embodiments.
Figure 6B:
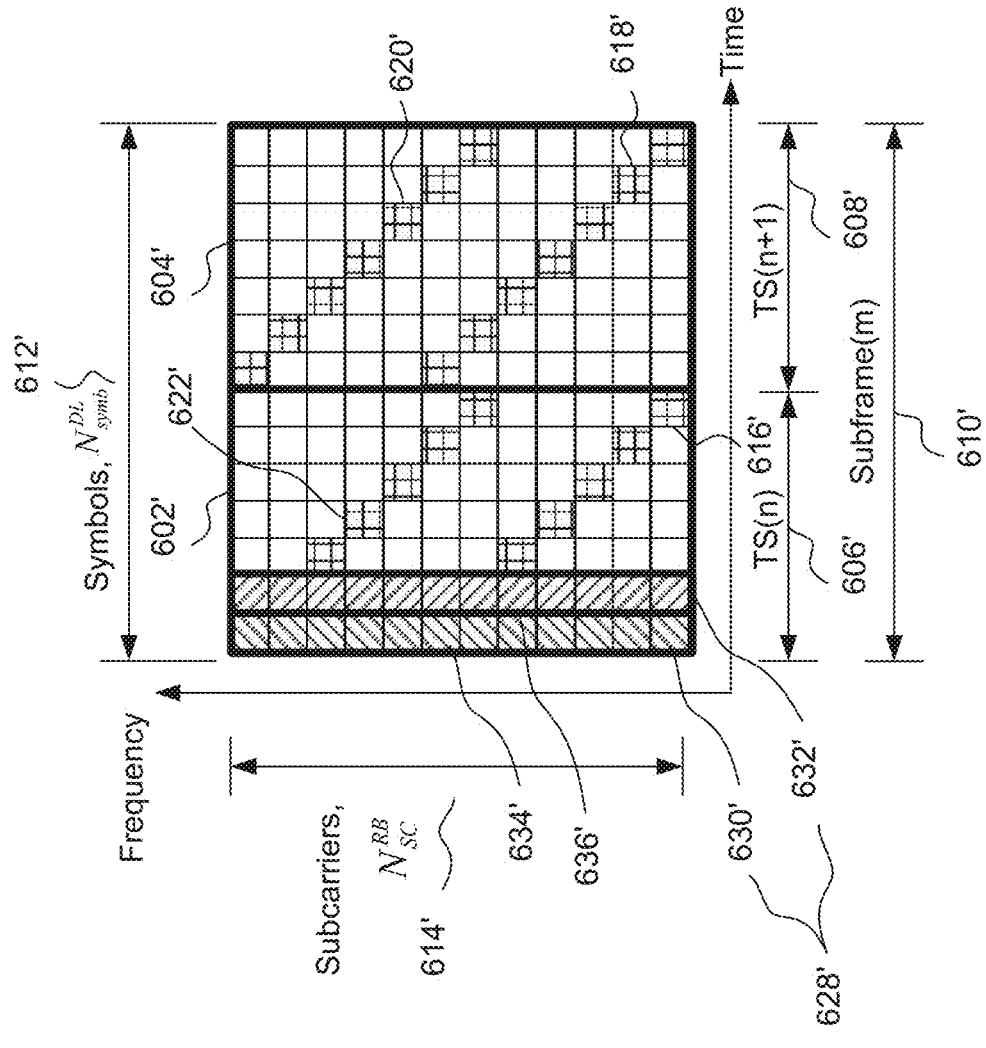

FIGS. 6A and 6B illustrate two discovery further signals 600A and 600B according to embodiments. The signals 600A and 600B can be used for supporting LTE in unlicensed spectrum.

Referring to FIG. 6A, there is shown a first discovery signal 600A having a resource grid structure of a plurality of resource elements arranged into two physical resource blocks 602 and 604 having a number of symbols 612 with respective numbers of subcarriers 614 spanning respective time slots 606 and 608 of a subframe 610.

It can be appreciated that the signal 600A comprises one or more than one occupied resource element. In the embodiment illustrated, a plurality of occupied resource elements is shown arranged in four groups 616, 618, 620 and 622. It can be appreciated that the resource elements are arranged according to a predetermined pattern. In the illustrated example, the resource elements of the signal 600A are diagonally disposed. In such an arrangement, resource elements within a group or set have respective symbols 612 and respective subcarriers 614.

The occupied resource elements can be arranged to bear prescribed data or other information. It can be appreciated that a gap-free design has been realised, that is, the signal 600A does not have any symbols without one or more than one occupied resource element. Viewed alternatively, it can be appreciated that every symbol has one or more than one occupied resource element.

It will also be noted that a predetermined number of subcarriers are also occupied. By coherently accumulating the resource elements within the subframe 610, it can be determined that all subcarriers 614 are also occupied, which assists with timing resolution.

Referring to FIG. 6B, there is shown a second discovery signal 600B. The signal 600B can be used for supporting LTE in unlicensed spectrum. The signal 600B having a resource grid structure of a plurality of resource elements arranged into two physical resource blocks 602' and 604' having a number of symbols 612' with respective numbers of subcarriers 614' spanning respective time slots 606' and 608' of a subframe 610'.

It can be appreciated that the signal 600B comprises one or more than one occupied resource element. In the embodiment illustrated, a plurality of occupied resource blocks is shown arranged in one or more than one group; the illustrated embodiment has four groups 616', 618', 620' and 622'.

It can be appreciated that the resource elements are arranged according to a predetermined pattern. In the illustrated example, the resource elements of the signal 600B are diagonally disposed. In such an arrangement, resource elements within a group or set have respective symbols 612' and respective subcarriers 614'.

The occupied resource elements can be arranged to bear prescribed data or other information. It can be appreciated that a gap-free design has been realised, that is, the signal 600B does not have any symbols without one or more than one resource element. Viewed alternatively, it can be appreciated that every symbol has one or more than one occupied resource element.

It will also be noted that a predetermined number of subcarriers are also occupied. By coherently accumulating the resource elements within the subframe 610', it can be determined that all subcarriers 614' are also occupied, which assists with timing resolution.

Also provided in the signal 600B is a legacy portion 628'. The legacy portion 628' is arranged to carry at least one of LTE-A signals and other signals. In the illustrated embodiment, the legacy portion 628' comprises first and second synchronization signals 630' and 632'. Embodiments can be realised in which the first and second synchronization signals 630' and 632' are at least one of the primary and secondary synchronization signals. It can be seen that a first symbol 634' bears the primary synchronization signal 630' and a second symbol 636' bears the secondary synchronization signal. Embodiments can be realised in which the legacy portion 628' comprises some other signal or signals, or a single instance of a signal such as another LTE-A signal or the like.

Again, it can be appreciated that having one or more than one occupied resource element, in essence, reserves a set of associated resource elements. In the embodiments illustrated, the set of associated resource elements comprises all other unoccupied resource elements of any symbol containing a respective occupied resource element.

It will be appreciated that embodiments disclosed herein construct a discovery signal that is gap-free, that is, all symbols, or at least a selectable portion of all symbols, or selectable symbols, are arranged to have at least one occupied resource element. One or more than one resource element of the resource elements of a physical resource block, or other unit of radio resource, can be rendered occupied in a number of ways. For example, a resource might be selected to transmit a signal relating to a synchronization signal, a positioning signal, a reference signal, an antenna port specific reference signal, data, or a tone not intended to convey any data all taken jointly and severally in any and all combinations. The data, for example, may be data associated with a given eNB and user equipment such as the eNB 104 or user equipment 1-6. Alternatively, or additionally, the data may be associated with an exchange between a present eNB 104 and a further user equipment or an alternative eNB and a further user equipment.

Therefore, embodiments can be realised in which one or more than one legacy signal is combined with occupied resource elements to produce an embodiment of a signal transmitted in an unlicensed frequency band that does not have any symbols without one or more than one occupied resource element. Such embodiments are depicted in FIGS. 7A and 7B. The discovery signals of FIGS. 7A and 7B can be used for supporting LTE in unlicensed spectrum.

Referring to FIG. 7A, there is shown a discovery signal 700A comprising a number of symbols 702 to 712 with respective occupied resource elements. In signal 700A it can be appreciated that a first symbol 702 has occupied resource elements 714 and 716. In the embodiment shown, the resource elements 714 and 716 are reference signals, such as, for example, cell-specific reference signals.

The second 704 and third 706 symbols have resource elements occupied with respective primary synchronization signals and a second symbol is occupied with respective secondary synchronization signals, that is, the discovery signal has at least one legacy portion.

Still further symbols 708, 710 and 712 also have occupied resource elements. Embodiments can be realised in which the occupied resource elements also bear reference signals such as, for example, cell-specific reference signals as can be seen in respect of a number of resource elements 718 to 726. However, they can equally well bear some other signals such as, for example, one or more positioning reference signals or any other signal.

However, one or more than one symbol is unoccupied. It can be appreciated that the fourth 728, sixth 730, seventh 732, $9^{th}$ to $11^{th}$ 734 to 738, $13^{th}$ 740 and $14^{th}$ 742 symbols have unoccupied resource elements. Viewed alternatively, the physical resource block has unoccupied time periods that do not bear any signals. In the illustrated embodiment, those time periods correspond to the duration of a symbol. An unoccupied symbol or time period represents an opportunity for another transmitting device, such as, for example, a 802.11 access point that operates according to a CSMA/CA algorithm, to gain control of the spectrum associated with the unoccupied symbols or unoccupied time periods. Losing control of the spectrum associated with unoccupied symbols renders would-be associated resource elements unusable as an OFDM symbol or as a SC-FDMA symbol.

Suitably, embodiments can be realised in which at least one resource element of an unoccupied symbol is populated with a signal to render it occupied. Referring to FIG. 7B, there is shown an embodiment of a discovery signal 700B that is identical to the signal 700A of FIG. 7A but for the addition of one or more than one signal to occupy one or more than one respective resource element of one or more than one formerly empty symbol. Therefore, it can be appreciated that the fourth 728, sixth 730, seventh 732, $9^{th}$ to $11^{th}$ 734 to 738, $13^{th}$ 740 and $14^{th}$ 742 symbols now have one or more than one occupied resource elements. The fourth symbol 728 has one or more than one occupied resource element. In the embodiment illustrated, two such occupied resource elements 742 and 744 are shown. The sixth symbol 730 has a number of occupied resource elements 746 and 748. Although the sixth symbol 730 has been illustrated as having two occupied resource elements, embodiments can be realised in which some other number of resource elements, such as, for example, one resource element is, or more than two resource elements are, used instead to create an occupied resource element or an occupied symbol or other occupied time period. The seventh symbol 732 also comprises a pair of resource elements 750 and 752. The same applies to the $9^{th}$ to $11^{th}$ 734 to 738, $13^{th}$ 740 and $14^{th}$ 742 symbols, which all bear respective pairs of occupied resource elements 754 to 772.

Although the signal 700B shown in and described with reference to FIG. 7B has created occupied resource elements, symbols or other time periods by populating selected pairs of resource elements, embodiments are not limited to such an arrangement. Embodiments can be realised in which some other number of resource elements per symbol are populated with respective signals such as, for example, one or more resource element of an empty symbol or other period could be populated with a respective signal.

The signals that are used to create occupied resource elements, occupied symbols or other occupied time slots are subcarrier signals. For example, the subcarrier signal can be an LTE signal such as, for example, a reference signal, a positioning signal, a data signal taken jointly and severally in any and all combinations.

Figures 8A, 8B:
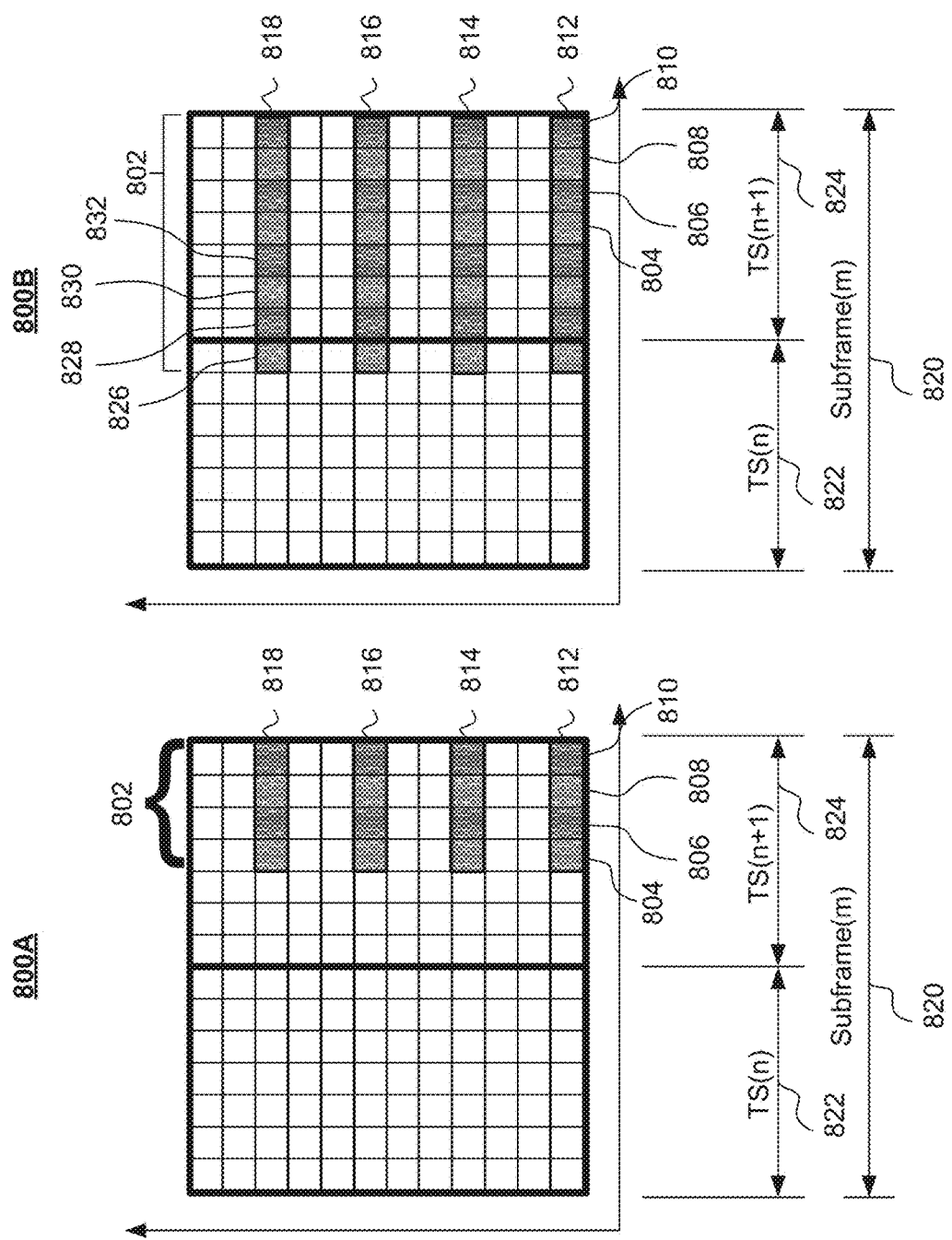
FIGS. 8A and 8B show discovery signals according to embodiments.

Typical CSMA/CA and CSMA/CD techniques use opportunistic carrier sensing based mechanisms when using unlicensed spectrum for wireless communications. Devices using such techniques typically occupy a relatively wide bandwidth while other devices seeking to make transmissions refrain from doing so until an opportune time. Even though a relatively wide bandwidth is occupied, such occupancy is for a relatively short period of time, which is of the order of hundreds of milliseconds to a few milliseconds. FIGS. 8A and 8B show embodiments of discovery signals 800A and 800B having prescribed or predetermined reservation durations that attempt to pre-empt use of an associated portion of a predetermined, unlicensed, radio resource.

Referring to FIG. 8A, there is shown a signal 800A, which is a discovery signal, comprising one or more than one set of symbols 802 having one or more than one populated resource element 804 to 810. In the present example, it can be appreciated that four such resource elements per symbol are shown. However, embodiments can equally well have some other number of resource elements such as one or more than one resource element per symbol.

In the present example, the populated resource elements are grouped to form respective temporally contiguous sets of resource elements 812 to 818. In the present example, it can be appreciated that four temporally contiguous sets of resource elements 812 to 818 are provided. However, embodiments are not limited to such a number of sets. Embodiments can be realised in which one or more than one set of temporally contiguous resource elements are provided.

The signal 800A is shown as comprising a single subframe 820 having two time slots 822 and 824. It will be appreciated that a set of four temporary contiguous resource elements spans a duration corresponding to 4 symbols. Therefore, in the case of, for example, seven symbols per time slot, the reserved radio resource corresponds to the resource elements spanning a 4×0.67 µs time period. In general, embodiments can be realised that span a time period that is a function of a number of symbols of a given symbol duration.

Therefore, referring to FIG. 8B, there is shown an embodiment of a signal 800B that is substantially the same as the signal 800A described with reference to FIG. 8A such that the same reference numerals refer to the same features, but for each set of resource elements 812 to 818 comprising a different predetermined number of temporally contiguous resource elements. In the embodiment illustrated, one or more than one set of temporally contiguous elements comprises eight resource elements, as can be appreciated from the additional four resource elements 826 to 832. The observations made above regarding the signal 800A of FIG. 8A are equally applicable to the signal 800B of FIG. 8B. An advantage of the signal 800B is that it will have improved tracking performance relative to the signal 800A.

It can be appreciated that the temporally contiguous resource elements of the signals 800A and 800B shown in and described with reference to FIGS. 8A and 8B span a predetermined portion of at least one of a time slot and subframe.

It will be appreciated that the resource elements of the signals shown in and described with reference to FIGS. 8A and 8B are temporally contiguous. However, embodiments are not limited to such arrangements. Embodiments can be realised in which occupied resource elements are compressed in the frequency domain, that is, embodiments can be realised in which the resource elements are contiguous in the frequency domain in the sense that resource elements of a Physical Resource Block are contiguous in the frequency domain, notwithstanding the respective subcarriers having respective bandwidths and channel spacing etc.

It can be appreciated that the signals 800A, 800B, 900A and 900B can be derived from LTE signals that would ordinarily have occupied resource elements that are, or would have been, distributed in the at least one of the time domain and frequency domain, such as, for example distributed CRS and/or PRS or other signals that are typically distributed throughout a PRB, but that have been compressed or otherwise grouped together in at least one of the time domain and the frequency domain.

FIG. 9A shows an embodiment of a signal 900A comprising a plurality (sixteen) of resources elements arranged across two time slots 902 and 904 of a subframe 906 of a physical resource block 908. It can be appreciated that one or more than one subcarrier is unused, that is, unoccupied. In the illustrated embodiment, the third subcarrier 910 and the ninth subcarrier 912 are unoccupied.

Therefore, FIG. 9B shows an embodiment of a signal 900B that compresses or otherwise groups the resource elements of the signal 900A so that the resource elements use subcarriers that are contiguous in the frequency domain. In the embodiment of the signal 900B illustrated it can be seen that the first eleven subcarriers 914 have one or more than one occupied resource element with the twelfth subcarrier 916 being unoccupied.

The compressed or otherwise grouped subcarriers 914 can be derived from one or more than one signal. For example, the subcarriers 914 can be derived from signals that would ordinarily not be grouped in the time domain or in the frequency domain. For example, at least one of cell-specific reference signals and positioning signals are usually distributed throughout a physical resource block. Embodiments can be realised in which at least one of such cell-specific reference signals and positioning signals are grouped in at least one of the time domain and the frequency domain.

It will also be appreciated that occupied resource elements of a physical resource block can be grouped in both the time and frequency domains. Such embodiments could also group normally distributed resource elements. Again, for example, the compressed or otherwise grouped subcarriers 914 can be derived from one or more than one signal. For example, the subcarriers 914 can be derived from signals that would ordinarily not be grouped in the time domain or in the frequency domain. For example, at least one of cell-specific reference signals, synchronization signals and positioning signals are usually distributed throughout a physical resource block. Embodiments can be realised in which at least one of such cell-specific reference signals and positioning signals are grouped in at least one of the time domain and the frequency domain.

Figure 10:
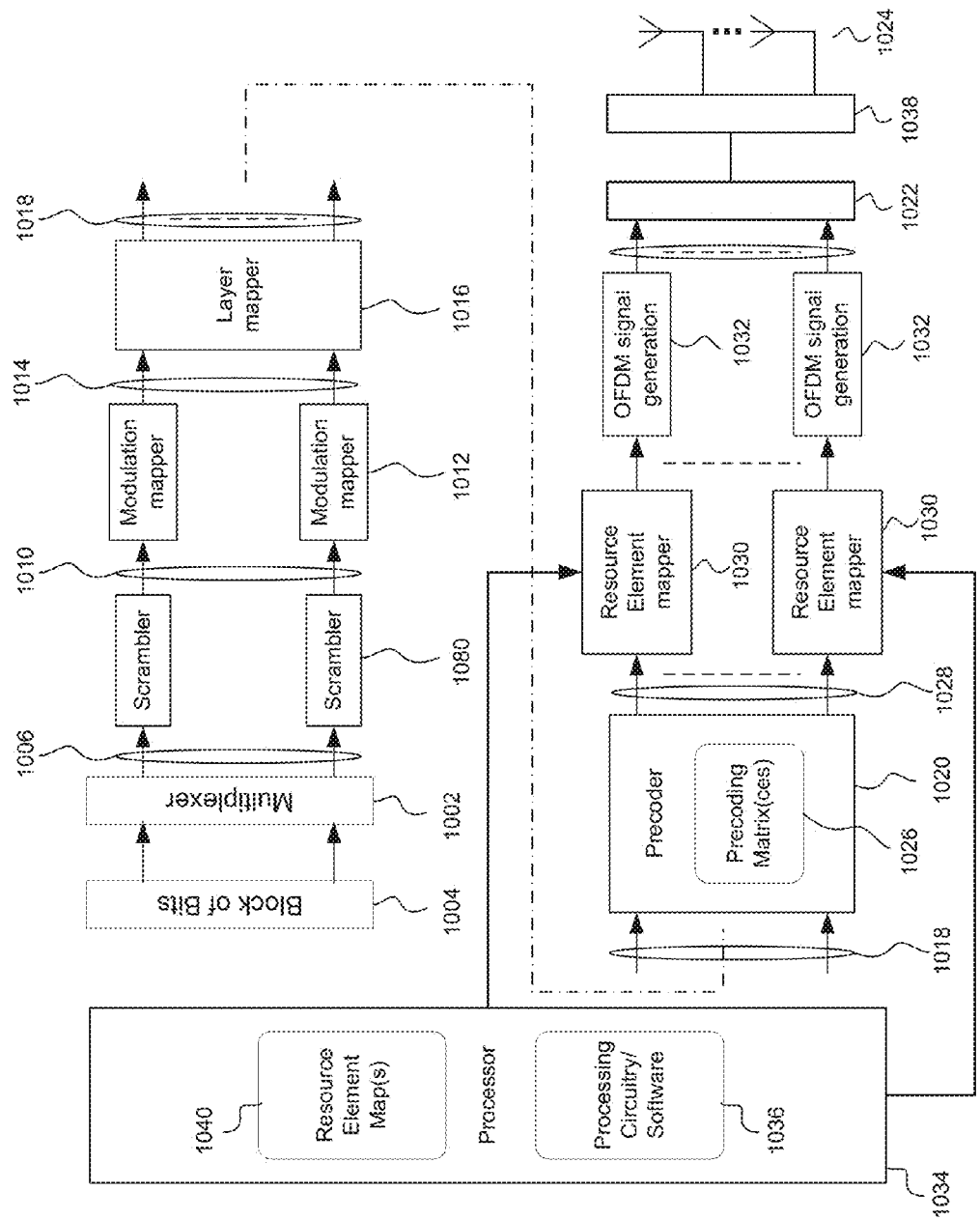
FIG. 10 depicts an eNB 1000 according to embodiments.

FIG. 10 depicts a system or apparatus, such as, an eNB 1000, for realising such discovery signal creation and transmission, within a predetermined unlicensed frequency band, in the form of a channel, such as, for example, a PDCCH, according to an embodiment for transmitting one or more than one of the discovery signals described herein.

The system 1000 of FIG. 10 depicts an architecture that can apply to one or more than one other channel as well as, or as an alternative to, the PDCCH. The one or more than one other channel can be, for example, another control channel or some other type of channel such as, for example, a PBCH, PDSCH, PCFICH, PDCCH, PHICH, PUCCH, PUSCH and PRACH; the latter three channels being uplinks in contrast to the former downlinks.

Baseband signals representing an uplink/downlink physical channel can be defined using the following operations and associated modules. The system 1000 may include a multiplexer 1002 for multiplexing a block of bits 1004. The multiplexer 1002 outputs multiplexed bits 1006 associated with the block of bits 1004.

A scrambler 1008 is configured to scramble the multiplexed block of bits 1006 to be transmitted in a transmission (e.g., over a physical channel). The scrambler 1006 is configured, therefore, to produce scrambled bits 1010.

Using information about the channel, the transmitter may tailor the transmit signal to the channel in a manner that simplifies or improves receiver processing. The receiver may generate the channel-related feedback information by processing training signals received from the transmitter.

A modulation mapper 1012 is configured to modulate the scrambled bits 1010 to generate modulation symbols 1014 for transmission. These generated modulation symbols 1014 can be complex-valued modulation symbols.

The modulation mapper 1012 can be configured to selectably use at least one of a binary phase shift keying (BPSK) constellation, a quadrature phase shift keying (QPSK) constellation, and a quadrature amplitude (QAM) constellation such as, for example, 8-QAM, 16-QAM, 64-QAM. The type of modulation used may depend on the signal quality or channel conditions. The modulation mapper 1012 is not limited to using such modulation constellations. The modulation mapper 1012 can, alternatively or additionally, use some other form of modulation constellation.

A layer mapper 1016 is configured to map the complex-valued modulation symbols 1014 onto one or more than one transmission layer of layered modulation symbols 1018.

A precoder 1020 is configured to precode the layered modulation symbols 1018 for transmission. The precoder 1012 may encode the complex-valued modulation symbols 1018 on each layer for transmission onto one or more than one respective antenna port 1022. Precoding may be used to convert antenna domain signal processing into the beam-domain processing. Additionally, the one or more than one antenna port 1022 may also be coupled to one or more than one respective antennas such as, for example, the plurality of antennas 1024 shown. The precoding performed by the precoder 1020 may be chosen from a finite set of precoding matrices 1026, called a codebook, that is known to both a receiver and a transmitter. The precoder 1020 is configured to output coded symbols 1028.

A resource element mapper 1030 is configured to map the coded symbols 1028 output by the precoder 1030 to respective resource elements. The resource element mapper 1030 maps at least one of actual data symbols, one or more than one reference signal symbol, one or more than one positioning signal, one or more than one synchronization signal and one or more than one control information symbol, taken jointly and severally in any and all combinations, into predetermined or selected respective resource elements in the resource grid. The mapping cab be performed according to, for example, one or more than one resource element map 1040. An embodiment of such a one or more than one resource element map 1040 is a template prescribing which resource elements should be populated or otherwise occupied.

The resource element mapper 1030 is configured to selectively ensure that appropriate or selectable resource elements of the resource grid are populated according to one or more than one embodiment described herein to produce a gap-free or other reservation signal for use in an unlicensed frequency band by a cellular system such as an eNB. The resource element mapper 1030 realises the mapping by directing the coded symbols 1028 to one or more than one OFDM signal generation module 1032.

The one or more than one OFDM signal generation module 1032 is configured to generate a complex-valued time-division duplex (TDD) and/or frequency division duplex (FDD) OFDM signal for the one or more than one antenna port 1022 for transmission via the one or more than one antenna 1024 after processing, such as up-conversion, by an RF front end 1038, to a selectable frequency band such as, for example, an unlicensed frequency band.

Also shown in FIG. 10, is a processor 1034. The processor 1034 comprises processing circuitry 1036 configured to coordinate the operation of the system 1000 and, in particular, to the control operation of the resource element mapper 1030 to produce the embodiments of the gap-free, or other reservation, discovery signals described herein. The processing circuitry 1036 can be realised using hardware or software or a combination of hardware and software. The software could be stored using a non-transitory or other non-volatile, storage such as, for example, a read-only memory or the like. It will be appreciated that the processor together with the resource element map and associated processing circuitry or software constitute an embodiment of a discovery signal generator, or at least part of a discovery signal generator. Additionally, or alternatively, the arrangement shown in FIG. 10 can constitute at least part or a whole discovery signal generator.

Although FIG. 10 has been described with reference to an eNB, embodiments are not limited thereto. Embodiments can additionally or alternatively be realised in which some other transmit point is configured to at least one of construct and output embodiments of the gap-free, or other reservation, signals described herein.

Figure 11A:
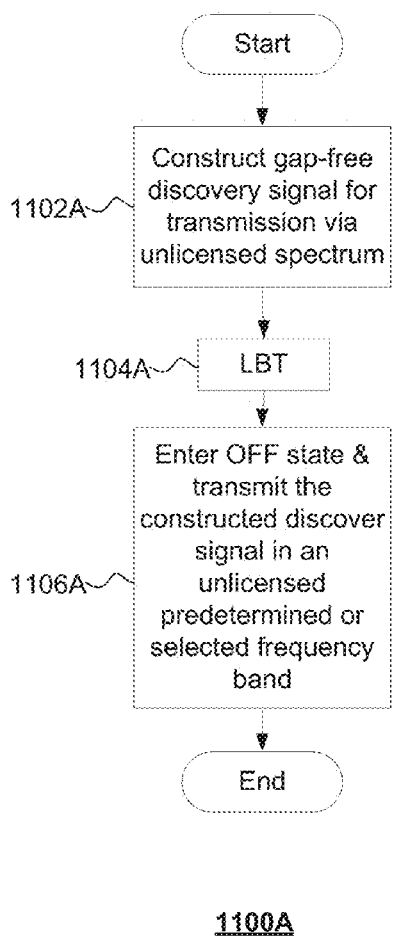
FIGS. 11a and 11B shows flowcharts according to embodiments.

Referring to FIG. 11A, there is shown a flowchart 1100A according to an embodiment for operating a system 1000 as shown in FIG. 10. The processing operations represented by the flowchart 1100A can be implemented using hardware, or software, that is, machine or processor executable instructions, or a combination of hardware and such software, as indicated above.

At 1102A, a discovery signal such as one or more of the above embodiments of discovery signals is constructed for transmission using a predetermined or selectable frequency band such as, for example, a frequency band not licensed for cellular systems and associated transmissions. For example, at least one of the above described 5 GHz upwards, 28 GHz upwards and 30 to 300 GHz frequencies taken jointly and severally in any and all permutations.

Optionally, at 1104A, the eNB, or other transmit point, performs a Listen Before Talk (LBT) procedure to determine whether or not the predetermined or selectable frequency band is free from interference. If the LBT procedure determines that the predetermined or selectable frequency band is free from interference, the eNB, or other transmit point, enters an OFF state during which only a discovery signal according to one or more of the above embodiments is transmitted at 1106A.

Figure 11B:
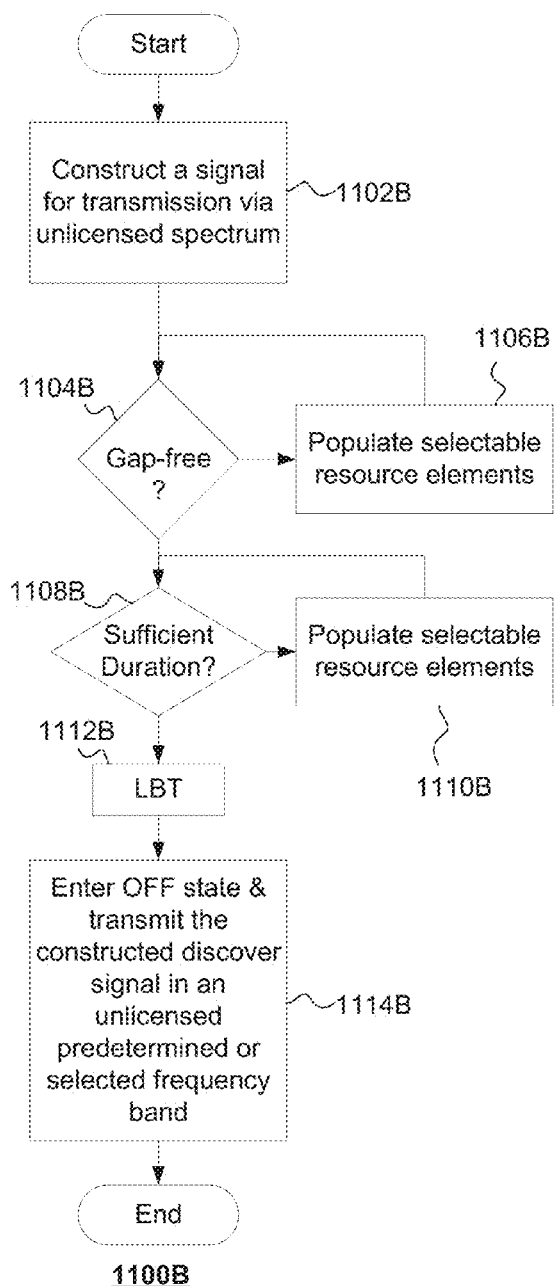

FIG. 11B shows a flowchart 1100B for constructing a discovery signal according to one or more than one of the above discovery signals. At 1102B, one or more than one discovery signal is constructed for transmission using a predetermined or selected frequency band. The frequency band corresponds to one or more than one band of frequencies that is not licensed for cellular use such as, for example, LTE-A cellular use.

A determination is made at 1104B regarding whether or not the constructed signal is gap-free, or has a prescribed minimum occupied portion, such as, for example, a number of contiguous occupied symbols. If the determination at 1104B is negative, at least one or more than one resource element associated with an empty symbol is populated with a selected signal at 1106B and processing resumes at 1104B again. The foregoing is repeated until an acceptable discovery signal has been constructed. Alternatively, or additionally, populating the selectable resource elements performed at 1106B could identify and populate sufficient unoccupied resource elements to result in a gap-free signal.

If the constructed discovery signal is gap-free, or is sufficiently gap-free, a determination is made at 1108B regarding whether or not the time duration corresponding to the symbols having occupied resource elements meets an acceptable minimum value. If the time duration is determined at 1108B to be insufficient, one or more than one unoccupied resource element is occupied to increase the time duration at 1110B and processing resumes again at 1108B. Alternatively, or additionally, if the time duration is deemed to be insufficient at 1108B, sufficient unoccupied resource elements are occupied to render the time duration sufficient.

Optionally, the eNB, or other transmit point, can use the above described LBT technique at 1112B in advance of transmitting the discovery signal using an unlicensed frequency band.

The eNB, or other transmit point, transmits the constructed discovery signal at 1114B and enters an OFF state. The discovery signal can be at least one or more than one of any of the discovery signals described herein.

Figure 12:
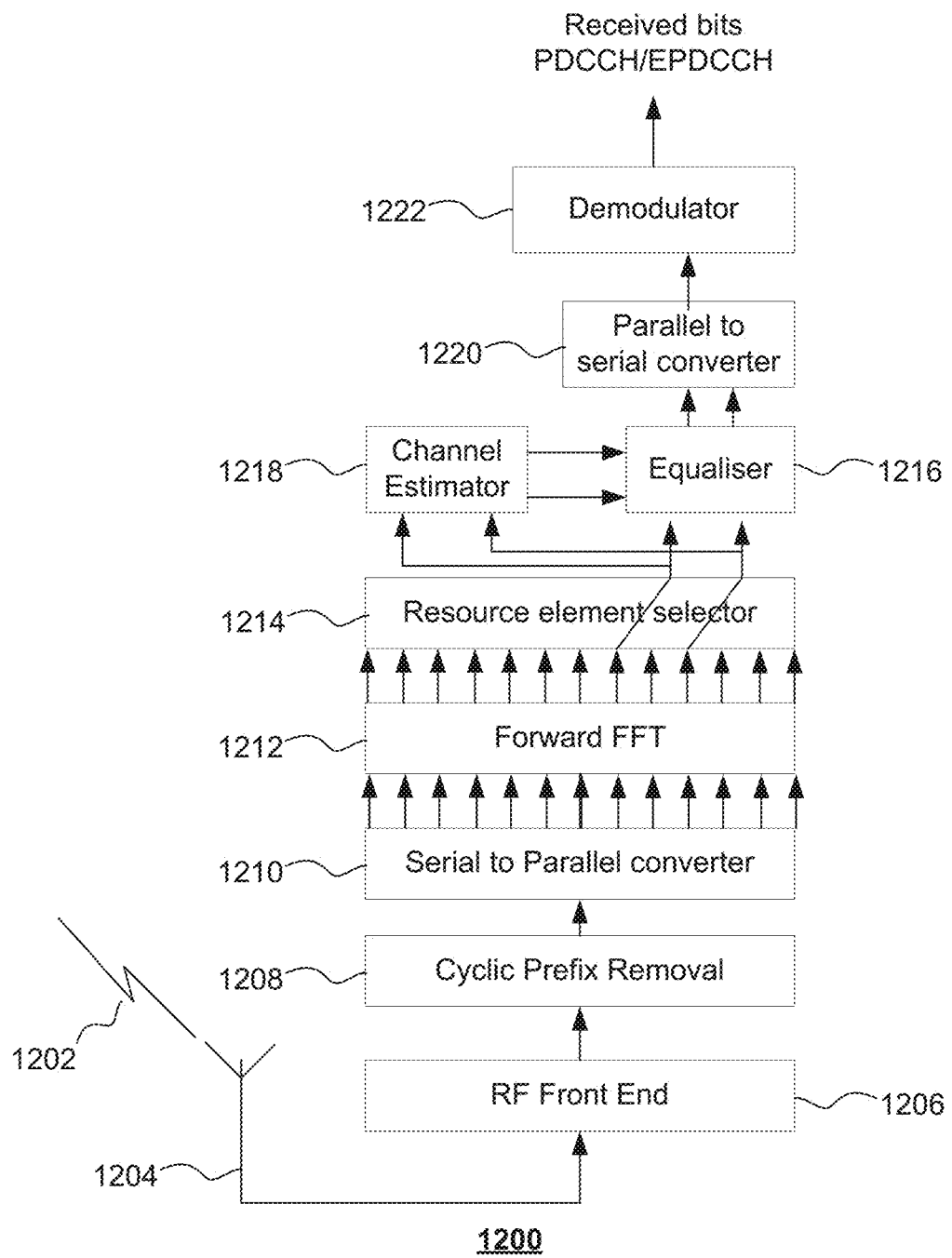
FIG. 12 illustrates a receiver system according to embodiments.

Referring to FIG. 12, there is shown schematically a view 1200 of a part of a user equipment (UE) for processing a received discovery signal according to an embodiment. A discovery signal 1202, such as one or more of the above-described gap-free discovery signals, transmitted, using an unlicensed frequency band, by, for example, an eNB, such as the above-described eNB, or other transmit point, is received via at least one or more than one antenna 1204, and, in some examples, is received by multiple antennas. The received discovery signal 1202 is processed by an RF front end 1206. The RF front end 1206 can comprise, for example, a filter (not shown) for filtering the received signal 1202 and Low Noise Amplifier (not shown).

A cyclic prefix removal module 1208 is arranged to remove any of the above mentioned cyclic prefixes. The signal 1202 is then passed through a serial to parallel converter 1210. The symbols output by the serial to parallel converter 1210 are processed by a forward Fast Fourier Transform module 1212. The output of the FFT module 1212 is passed to a resource element selector 1214, which selects the radio resources intended for the receiving UE for further processing and ignores other radio resources since they are typically intended for other UEs.

The selected radio resources are processed by an equalizer 1216 and a channel estimator 1218. The channel estimator 1218 processes the selected radio resources with a view to influencing the operation of the equalizer 1216. The output of the equalizer 1216 is converted into serial form, via a parallel to serial converter 1220. The parallel signals are then processed by a demodulator 1222 that is adapted to demodulate any received data to recover at least one of, and perhaps both of, subcarriers and symbols constituting the above-described discovery signals, which could represent, for example, the PDCCH and the EPDCCH.

It will be appreciated that at least one or more of the RF front end 1206, cyclic prefix module 1208, serial to parallel converter 1210, FFT module 1212, resource element selector 1214, equaliser 1216, channel estimator 1218, parallel to serial converter 1220 and demodulator, taken jointly and severally in any and all combinations, are examples of processing elements.

The data output by the demodulator 1222 can comprises, for example, at least one of identification data such as, for example, a cell-specific reference signal, CRS, either with or without a respective port, and synchronization data such as, for example, at least one of a primary (PSS) or secondary synchronization signal (SSS), and positioning signals taken jointly and severally in any and all combinations, which can then be used by the user equipment in wireless communications with the eNB using the radio resources implicitly reserved by the discovery signal.

Alternatively, or additionally, having established communication between the eNB, or other transmit point, and the user equipment, the eNB can assign other radio resources to the UE for supporting communication between the eNB and the user equipment.

Figure 13:
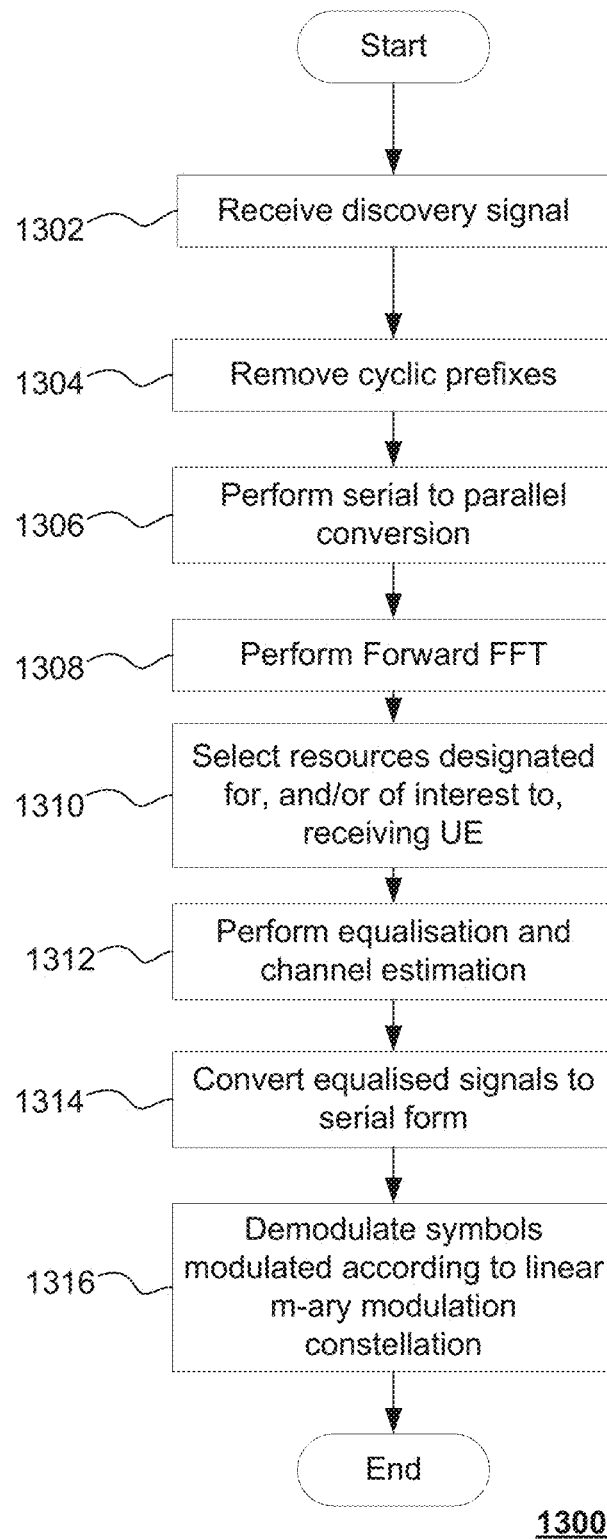
FIG. 13 depicts a flowchart according to embodiments.

Referring to FIG. 13, there is shown a flowchart 1300 depicting processing undertaken by UE according to embodiments. The discovery signal 1202 containing resource elements for supporting wireless communications in the unlicensed spectrum is received at 1302. The normal and/or extended cyclic prefixes are removed at 1304 prior to serial to parallel conversion at 1306. The resulting parallel symbols are subjected to a forward FFT at 1308. The output of the FFT 1212 is processed by the resource element selector 1214 at 1310 to select those radio resources that are designated for the receiving UE 1200. Equalisation, with or without channel estimation, is undertaken at 1312. The equalised selected radio resources are output for parallel to serial conversion at 1314 and demodulated at 1316.

Figure 14:
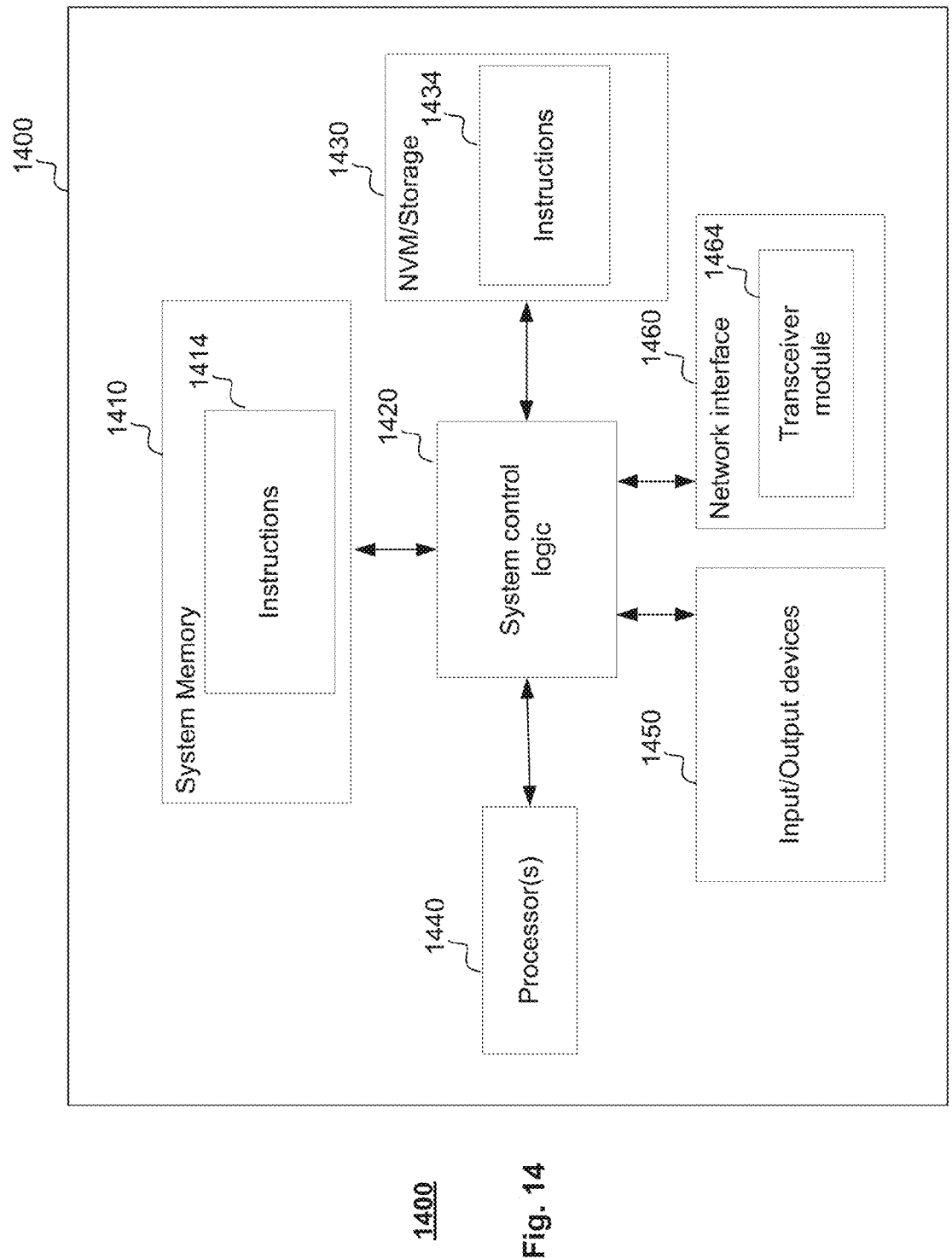
FIG. 14 shows a system according to an embodiment.

FIG. 14 illustrates, for one embodiment, an example system 1400 for realising a UE 1200 as described above with reference to FIGS. 12 and 13 taken jointly and severally. The system 1400 comprises one or more processor(s) 1440, system control logic 1420 coupled with at least one of the processor(s) 1440, system memory 1410 coupled with system control logic 1420, non-volatile memory (NVM)/storage 1430 coupled with system control logic 1420, and a network interface 1460 coupled with system control logic 1420. The system control logic 1420 may also be coupled to Input/Output devices 1450. The system is arranged to receive and process one or more than one of the discovery signal embodiments transmitted over an unlicensed frequency band that is not licensed for cellular use.

Processor(s) 1440 may include one or more single-core or multi-core processors. Processor(s) 1440 may include any combination of general-purpose processors and/or dedicated processors (e.g., graphics processors, application processors, baseband processors, etc.). Processors 1440 may be operable to carry out the above described signal processing using suitable instructions or programs (i.e. operate via use of processor, or other logic, instructions). The instructions may be stored in system memory 1410, as system memory instructions 1414, or, additionally or alternatively, may be stored in (NVM)/storage 1430, as NVM instructions 1434.

System control logic 1420, for one embodiment, may include any suitable interface controllers to provide for any suitable interface to at least one of the processor(s) 1440 and/or to any suitable device or component in communication with system control logic 1420.

System control logic 1420, for one embodiment, may include one or more memory controller(s) to provide an interface to system memory 1410. System memory 1410 may be used to load and store data and/or instructions for system 1400. System memory 1410, for one embodiment may, include any suitable volatile memory, such as suitable dynamic random access memory (DRAM), for example.

NVM/storage 1430 may include one or more than one tangible, non-transitory computer-readable medium used to store data and/or instructions, for example. NVM/storage 1430 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1430 may include a storage resource that is physically part of a device on which the system 1400 is installed or it may be accessible by, but not necessarily a part of, the device. For example, the NVM/storage 1430 may be accessed over a network via the network interface 1460.

System memory 1410 and NVM/storage 1430 may respectively include, in particular, temporal and persistent copies of, for example, the instructions 1414 and 1434, respectively. Instructions 1414 and 1434 may include instructions that when executed by at least one of the processor(s) 1440 result in the system 1400 implementing the processing described above with reference to FIGS. 12 and 13, or the method(s) of any other embodiment, as described herein. In some embodiments, instructions 1414 and 1434, or hardware, firmware, and/or software components thereof, may additionally/alternatively be located in the system control logic 1420, the network interface 1460, and/or the processor(s) 1440.

Network interface 1460 may have a transceiver module 1464 to provide a radio interface for system 1400 to communicate over one or more network(s) (e.g. wireless communication network) and/or with any other suitable device. The transceiver 1464 may be implement receiver module that performs the above processing of the received signals to realise interference mitigation. In various embodiments, the transceiver 1464 may be integrated with other components of system 1400. For example, the transceiver 1464 may include a processor of the processor(s) 1440, memory of the system memory 1410, and NVM/Storage of NVM/Storage 1430. Network interface 1460 may include any suitable hardware and/or firmware. Network interface 1460 may be operatively coupled to the antenna, or to a plurality of antennas, 1204 to provide SISO or a multiple input, multiple output radio interface. Network interface 1460 for one embodiment may include, for example, a network adapter, a wireless network adapter, a telephone modem, and/or a wireless modem.

For one embodiment, at least one of the processor(s) 1440 may be packaged together with logic for one or more controller(s) of system control logic 1420. For one embodiment, at least one of the processor(s) 1440 may be packaged together with logic for one or more controllers of system control logic 1420 to form a System in Package (SiP). For one embodiment, at least one of the processor(s) 1440 may be integrated on the same die with logic for one or more controller(s) of system control logic 1420. For one embodiment, at least one of the processor(s) 1440 may be integrated on the same die with logic for one or more controller(s) of system control logic 1420 to form a System on Chip (SoC).

In various embodiments, the I/O devices 1450 may include user interfaces designed to enable user interaction with the system 1400, peripheral component interfaces designed to enable peripheral component interaction with the system 1400, and/or sensors designed to determine environmental conditions and/or location information related to the system 1400.

Figure 15:
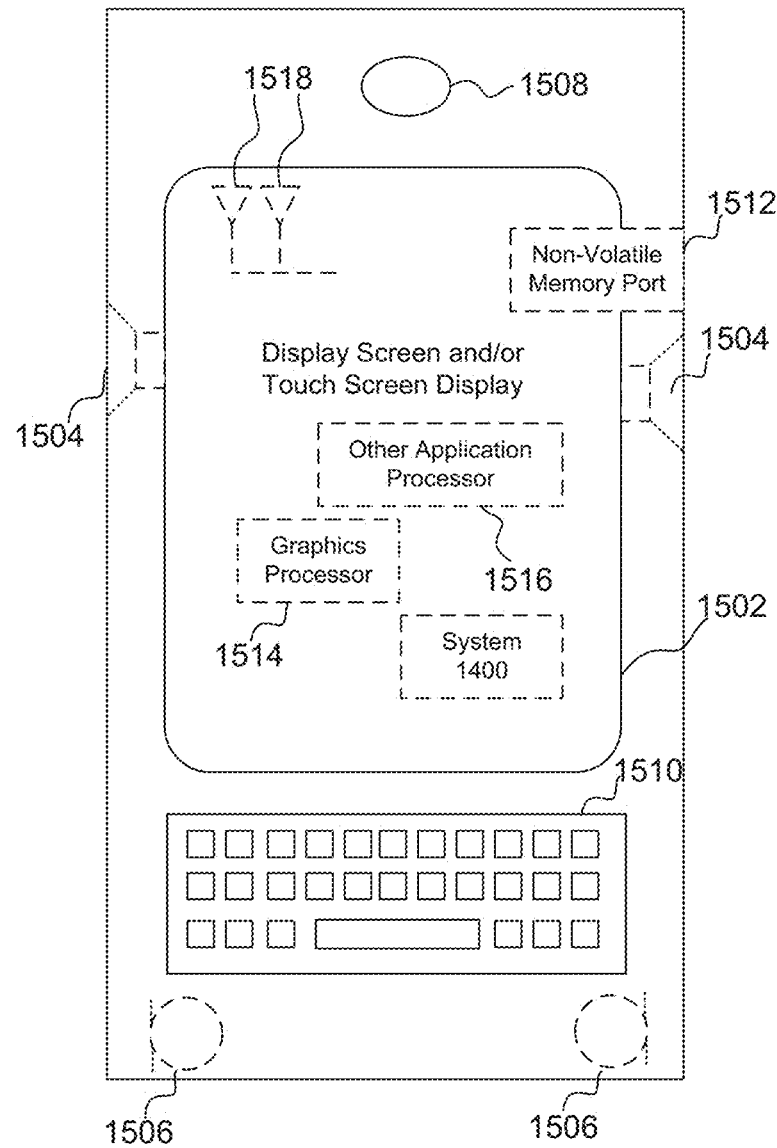
FIG. 15 illustrates a user equipment according to an embodiment.

FIG. 15 shows an embodiment in which the system 1400 is used to realise a UE. Such a user equipment can be realised in form of a mobile device 1500.

In various embodiments, user interfaces of the mobile device 1500 could include, but are not limited to, a display 15020 (e.g., a liquid crystal display, a touch screen display, etc.), a speaker 1504, a microphone 1506, one or more cameras 1580 (e.g., a still camera and/or a video camera), a flashlight (e.g., a light emitting diode flash), and a keyboard 1510.

In various embodiments, the peripheral component interfaces may include, but are not limited to, a non-volatile memory port 1512, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1460 to communicate with components of a positioning network, e.g., a global positioning system (GPS) satellite.

In various embodiments, the system 1500 may be a mobile computing device such as, but not limited to, a laptop computing device, a tablet computing device, a netbook, a mobile phone, etc. In various embodiments, system 1500 may have more or less components, and/or different architectures.

Although the embodiments herein have been described with reference to two resource blocks, embodiments are not limited thereto. Embodiments can be realised in which some other number of resource blocks are used such as, for example, one resource block or more than two resources blocks. The number of resource blocks used, and, more particularly, the population or occupation of the resource elements of those resource blocks influence the radio resources reversed for wireless communication.

In the embodiments described herein, the subcarriers have frequencies that correspond to an unlicensed frequency band, that is, to a spectrum that has not be licensed for use by a wireless cellular communication system such as, for example, any of the spectra used for LTE and LTE-A or other LTE-derived standard taken jointly and severally in any and all permutations. However, embodiments are not limited thereto. Embodiments can be realised in which the subcarriers can comprise frequencies that selectably correspond to unlicensed frequencies and licensed frequencies or at least one of unlicensed and licensed frequencies.

In various embodiments, the UE and/or the eNB may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing. The UE may provide some type of channel state information (CSI) feedback to the eNB via one or more up link channels, and the eNB may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE may transmit CSI feedback to the eNB. The CSI feedback may include information related to channel quality index (CQI), precoding matrix indicator (PMI), and rank indication (RI). PMI may reference, or otherwise uniquely identity, a precoder within the codebook. The eNB may adjust the downlink channel based on the precoder referenced by the PMI.

The components and features of the above eNBs and UEs may be implemented using any combination of discrete circuitry, application specific integrated circuits (ASICs), logic gates and/or single chip architectures. Further, the features of UE may be implemented using microcontrollers, programmable logic arrays and/or microprocessors or any combination of the foregoing where suitably appropriate. It is noted that hardware, firmware and/or software elements may be collectively or individually referred to as "logic" or "circuit".

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, eNodeB or transmit points, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

The embodiments herein have been described within the context of using millimeter wave frequencies or one or more than one millimeter frequency band for the unlicensed spectrum or spectra. However, embodiments are not limited to such frequencies. Embodiments can be realised in which other frequencies bands can be used.

Embodiments described herein show the smaller cells as being overlaid on a macro-cell. However, embodiments are not limited thereto. Any and all embodiments can be realised in which the smaller cells are operable without being overlaid on a macro-cell or any other cell.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

It will be appreciated that the discovery signals described have several advantages such as, for example, one or more of the following taken jointly and severally in any and all permutations:

(1) At least one of cell discovery and identification: transmitting such a discovery signal ensures that the cell or eNB can be discovered by one or one than one user equipment; especially if the discovery signal also contains cell identification data or signals;

(2) if the unlicensed spectrum, or unlicensed carrier type, is not contiguous with or collocated with an eNB using licensed spectrum, then some form of signalling can be useful in assisting a user equipment in obtaining coarse/frequency synchronisation;

(3) if a user equipment is operating using LTE in unlicensed spectrum, embodiments of the discovery signal described herein can assist the user equipment in performing inter and/or intra-frequency RRM measurements. One skilled in the art appreciates that, during an ON state, a UE can use the CRS to perform such measurements. However, such a signal is not available during on OFF state. Therefore, embodiments of the discovery signals described herein can be used for such measurements. Additionally, when a user equipment is not connected to an eNB using LTE in unlicensed spectrum, the user equipment can use embodiments of the discovery signals described herein for handover purposes;

(4) Embodiments of the discovery signals described herein can be used to provide channel quality information (CQI) to an eNB, or other network entity, supporting LTE over unlicensed spectrum;

(5) One skilled in the art appreciates that proper demodulation of data requires at least one of precise frequency and time tracking. Embodiments of the discovery signals described herein can be used to realise such precise frequency and time tracking.

Although there have been described example embodiments of this novel invention, many variations and modifications are possible without departing from the scope of the invention. Accordingly the inventive embodiments are not limited by the specific disclosure above, but rather only by the scope of the appended claims and their legal equivalents.

Embodiments can be realised according to the follow clauses:

Clause 1. An eNB for transmitting a discovery signal; the eNB comprising
a transmitter configured to operate within at least two predeterminable frequency bands;
the at least two predeterminable frequency bands comprising a first licensed frequency band licensed for cellular communications and a second unlicensed frequency band not licensed for cellular communications;
the transmitter being further configured to output a discovery signal associated with the second unlicensed frequency band; the discovery signal comprising at least one physical resource block with a plurality of associated resource elements representing a plurality of respective symbols;
at least a selected number of resource elements of the plurality of associated resource elements are arranged, as signal bearing resource elements, according to a predetermined pattern; the predetermined pattern being adapted to span at least a predetermined portion of the physical resource block.

Clause 2. The eNodeB of clause 1, wherein the predetermined pattern is arranged to occupy at least one resource element of a plurality of symbols.

Clause 3. The eNodeB of clause 2, wherein the predetermined pattern is arranged to occupy at least one resource element of all symbols of the physical resource block.

Clause 4. The eNodeB of clause 1, wherein the predetermined pattern comprises temporally disparate or contiguous resource elements having a common subcarrier.

Clause 5. The eNodeB of clause 1, wherein the predetermined pattern comprises a plurality of temporally contiguous resource elements.

Clause 6. The eNodeB of clause 1, wherein the predetermined pattern comprises a plurality of resource elements having distinct respective subcarriers.

Clause 7. The eNodeB of clause 1, wherein the predetermined pattern comprises a plurality of resource elements having contiguous respective subcarriers.

Clause 8. The eNodeB of clause 1, wherein the predetermined pattern comprises a plurality of resource elements having respective contiguous subcarriers and respective contiguous symbols.

Clause 9. The eNodeB of clause 1, wherein the predetermined pattern comprises at least one signal bearing resource element in each symbol.

Clause 10. The eNodeB of clause 1, wherein the predetermined pattern comprises at least one signal bearing resource element in all symbols.

Clause 11. The eNodeB of clause 1, wherein the transmitter is configure to populate one or more empty resource elements of the physical resource block with signal bearing resource elements.

Clause 12. The eNodeB of clause 1, wherein the transmitter is configured to output the discovery signal periodically or aperiodically.

Clause 13. The eNodeB of clause 1, wherein the eNB comprises a plurality of states; a first state being an ON state and a second state being an OFF state; the transmitter is further configured, during the OFF state, to transmit the discovery signal.

Clause 14. The eNodeB of clause 1, wherein the eNB comprises a plurality of states; a first state being an ON state and a second state being an OFF state; the transmitter is further configured, during the OFF state, to transmit only the discovery signal.

Clause 15. A user equipment for receiving and processing a discovery signal associated with an unlicensed frequency band; the user equipment comprising:
an RF front end comprising
a tuneable receiver configured to be selectably operable within at least one of a licensed frequency band and an unlicensed frequency band to receive at least a plurality of subcarriers, within the unlicensed frequency band, bearing a discovery signal spanning multiple symbols; the discovery signal bearing one or more than one resource element having at least identification data associated with a transmit point and one or more than one resource element available for use in wireless communications between the user equipment and the transmit point;

a demodulator configured to demodulate the plurality of the subcarriers bearing the discovery signal;

processing circuitry configured to process the demodulated subcarriers to extract the identification data and to identify the one or more than one resource element available for use in wireless communications between the user equipment and the transmit point; and at least one of a transmitter configured to output a signal to the transmit point; the signal being carried by one or more than one of the one or more than one resource element available for use in wireless communications between the user equipment and the transmit point and the receiver being further configured to be operable to receive one or more than one signal associated with the one or more than one available resource element for such wireless communications.

Clause 16. The user equipment of clause 14, wherein the identification data comprises a cell-specific reference signal.

Clause 17. An eNB for supporting wireless communications with a user equipment; the eNB comprising a. a processor comprising processing circuitry configured to output (at least one of) reservation data and identification data to be carried by a plurality of respective subcarriers b. a transmitter operable over an unlicensed frequency band; the transmitter being arrange to output a plurality of OFDM symbols bearing respective pluralities of resource elements; one or more of the resources elements of one or more than one OFDM symbol bearing at least one of the reservation data and identification data to reserve at least a portion of the unlicensed frequency band for supporting a wireless communication between the eNB and a user equipment; the plurality of OFDM symbols also bearing a plurality of available resource elements for use in supporting wireless communication between the eNB and the user equipment;

Clause 18. The eNB of clause 17, further comprising an antenna for outputting the plurality of ODFM symbols.

Clause 19. A method of wireless communication; the method comprising:

a. generating identification data associated with a transmit point;

b. producing a discovery signal for transmission over an unlicensed spectrum;

the discovery signal comprising a number of resource elements; at least one resource element bearing the identification data associated with a transmit point; the discovery signal also bearing one or more than one further resource element associated with the at least one resource element bearing identification data associated with the transmit point; the one or more than one further resource element being available for wireless communications with the transmit point;

c. wirelessly transmitting the discovery signal over the unlicensed spectrum.

Clause 20. The method of clause 19, wherein producing the discovery signal comprises determining which resource elements of the discovery signal are unoccupied resource elements and ensuring that at least one resource element of associated resources elements of a respective symbol comprising the unoccupied resource elements additionally comprises at least one occupied resource element.

Clause 21. The method of clause 19, wherein producing the discovery signal comprises populating at least one resource element of at least a plurality of symbols having respective resource elements with at least one respective subcarrier.

Clause 22. The method of clause 21, wherein the at least one respective subcarrier conveys the identification data.

Clause 23. The method of clause 19, wherein producing the discovery signal comprises populating at least one unoccupied resource element of at least one symbol of a plurality of symbols.

Clause 24. The method of clause 19, wherein producing the discovery signal comprises populating at least one unoccupied resource element of a selected number of a plurality of symbols.

Clause 25. The method of clause 19, wherein producing the discovery signal comprises populating at least one unoccupied resource element of all symbols of a plurality of symbols.

Clause 26. A method for wireless communication; the method comprising a. reserving one or more than one resource element of a respective symbol having a plurality of resource elements for supporting wireless communication between an eNB and a user equipment;

b. occupying at least one resource element of the one or more than one resource element of the respective symbol with a signal carrying identification data associated with the eNB; and c. transmitting a discovery signal comprising the one or more than one reserved resource element and the occupied resource element;

d. wherein the resource elements of the respective symbol correspond to a portion of an unlicensed frequency band.

Clause 27. A method for wireless communication; the method comprising a. receiving a discovery signal; the discovery signal comprising a number of subcarriers corresponding to an unlicensed spectrum; one or more than one subcarrier of the subcarriers bearing transmit point identification data and one or more than one further associated subcarrier of the subcarriers for supporting wireless communication between a user equipment and the transmit point;

b. processing the discovery signal to recover the identification data and identify the one or more than one further associated subcarrier; and c. transmitting a wireless communication signal using the identification data and the one or more than one further associated subcarrier.

Clause 28. The method of clause 27, in which the discovery signal a plurality of transmit point identification data.

Clause 29. The method of clause 28, in which the plurality of transmit point identification data have a common subcarrier.

Clause 30. The method of clause 29, in which the plurality of transmit point identification data have a common symbol.

Clause 31. The method of clause 27, in which the transmit point identification data are disposed in at least one of time and frequency to facilitate at least one of:

a. Time synchronisation;

b. Frequency synchronisation;

c. distributed across a plurality of at least one of a number of the subcarriers and a number of symbols, having respective subcarriers;

d. timing resolution.

Clause 32. A method of constructing a wireless signal for transmission using an unlicensed spectrum; the method comprising a. selecting a predetermined radio resource partitioned in the time and frequency domains; the frequency domain partitions corresponding to respective unlicensed frequencies;

b. creating a signal for each time domain partition by generating at least one signal having a frequency associated with a respective one of the frequency domain signals;

c. producing a combined signal by combining the signals of each of the time domain partitions; and d. outputting the combined signal for transmission.

Clause 33. Non-transitory machine readable medium storing machine-executable instructions arranged, when executed to, implement the method of any of clauses 19 to 31.

Clause 34. A discovery signal for wireless cellular communications; the discovery signal comprising:

a. a plurality of resource elements; each resource element spanning a respective unlicensed frequency and a respective symbol;

b. wherein the resources elements are grouped to form at least one resource block, and c. wherein at least one resource element bears prescribed data.

Clause 35. The discovery signal of clause 34, wherein the prescribed data is identification data.

Clause 36. The discovery signal of clause 35, wherein the prescribed data is identification data associated with at transmit point or eNB.

Clause 37. The discovery signal of clause 34, wherein the prescribed data comprises a reference signal.

Clause 38. The discovery signal of clause 37, wherein the reference signal is a cell-specific reference signal.

Clause 39. The discovery signal of clause 34, wherein the prescribed data comprises at least one synchronisation signal.

Clause 40. The discovery signal of clause 39, wherein the at least one synchronisation signal comprises at least one of a primary synchronisation signal and a secondary synchronisation signal.

Clause 41. The discovery signal of clause 34, wherein the resource block comprises a plurality of such symbols formed from the plurality of resource elements.

Clause 42. The discovery signal of clause 41, wherein at least a number of the plurality of symbols comprises an occupied resource element.

Clause 43. The discovery signal of clause 42, wherein each symbol of the plurality of symbols comprises an occupied resource element.

Clause 44. Discovery signal generator for constructing a wireless signal for transmission using an unlicensed spectrum; the generator comprising a. means for selecting a predetermined radio resource partitioned in the time and frequency domains; the frequency domain partitions corresponding to respective unlicensed frequencies;

b. means for creating a signal for each time domain partition by generating at least one signal having a frequency associated with a respective one of the frequency domain signals;

c. means for producing a combined signal by combining the signals of each of the time domain partitions; and d. means for outputting the combined signal for transmission.

Clause 45. A method for constructing a discovery signal for transmission by an LTE eNB using unlicensed spectrum; the method comprising a. selecting signals associated with respective subcarriers distributed in at least one of the time domain and frequency domain throughout a physical resource block;

b. grouping the selected signals into respective resource elements that are contiguous within at least the time domain to form grouped selected signals; and c. outputting the grouped selected signals for transmission.

Clause 46. The method of clause 45, in which the selected signals comprise one or more than one of identification data, a cell-specific reference signal either with or without a respective port, a synchronization signal, at least one of a primary (PSS) or secondary synchronization signal (SSS) and one or more than one positioning signal.

Clause 47. An apparatus substantially as described herein with reference to and/or as illustrated any of the accompanying drawings.

Clause 48. A system substantially as described herein with reference to and/or as illustrated any of the accompanying drawings.

Clause 49. An eNB substantially as described herein with reference to and/or as illustrated any of the accompanying drawings.

Clause 50. A user equipment apparatus substantially as described herein with reference to and/or as illustrated any of the accompanying drawings.

Clause 51. A machine executable program apparatus substantially as described herein with reference to and/or as illustrated any of the accompanying drawings.

Clause 52. A non-transitory machine readable medium substantially as described herein with reference to and/or as illustrated any of the accompanying drawings.

The invention claimed is:

1. One or more non-transitory, computer-readable media having instructions that, when executed, cause an eNB to:
operate within at least two predeterminable frequency bands, the at least two predeterminable frequency bands comprising a first licensed frequency band licensed for cellular communications and a second unlicensed frequency band not licensed for cellular communications;
output a discovery signal associated with the second unlicensed frequency band, the discovery signal comprising at least one physical resource block with a plurality of associated resource elements representing a plurality of respective symbols, wherein at least a selected number of resource elements of the plurality of associated resource elements are arranged, as signal bearing resource elements, according to a predetermined pattern, the predetermined pattern being a diagonal pattern arranged to occupy at least one resource element of each symbol of the at least one physical resource block.

2. The one or more non-transitory, computer-readable media of claim 1, wherein the predetermined pattern comprises temporally disparate resource elements having a common subcarrier.

3. The one or more non-transitory, computer-readable media of claim 1, wherein the predetermined pattern comprises a plurality of temporally contiguous resource elements.

4. The one or more non-transitory, computer-readable media of claim 1, wherein the predetermined pattern comprises a plurality of resource elements having distinct respective subcarriers.

5. The one or more non-transitory, computer-readable media of claim 1, wherein the predetermined pattern comprises a plurality of resource elements having contiguous respective subcarriers.

6. The one or more non-transitory, computer-readable media of claim 1, wherein the predetermined pattern comprises a plurality of resource elements having respective contiguous subcarriers and respective contiguous symbols.

7. The one or more non-transitory, computer-readable media of claim 1, wherein the instructions, when executed, further cause the eNB to populate one or more empty resource elements of the physical resource block with signal bearing resource elements.

8. The one or more non-transitory, computer-readable media of claim 1, wherein the instructions, when executed, further cause the eNB to output the discovery signal periodically or aperiodically.

9. The one or more non-transitory, computer-readable media of claim 1, wherein the eNB comprises a plurality of states; a first state being an ON state and a second state being an OFF state; and the instructions, when executed, further cause the eNB to transmit the discovery signal during the OFF state.

10. The one or more non-transitory, computer-readable media of claim 1, wherein the eNB comprises a plurality of states; a first state being an ON state and a second state being an OFF state; and the instructions, when executed, further cause the eNB to transmit only the discovery signal during the OFF state.

11. A user equipment for receiving and processing a discovery signal associated with an unlicensed frequency band; the user equipment comprising:
  a tuneable receiver to be selectably operable within at least one of a licensed frequency band and an unlicensed frequency band to receive at least a plurality of subcarriers, within the unlicensed frequency band, bearing a discovery signal spanning multiple symbols; the discovery signal bearing one or more than one resource element having at least identification data associated with a transmit point and one or more than one resource element available for use in wireless communications between the user equipment and the transmit point, wherein the discovery signal is transmitted as a diagonal pattern on at least one resource element of each symbol of a resource block;
  a demodulator to demodulate the plurality of the subcarriers bearing the discovery signal;
  processing circuitry to process the demodulated subcarriers to extract the identification data and to identify the one or more than one resource element available for use in wireless communications between the user equipment and the transmit point; and
  a transmitter to output a signal to the transmit point, the signal being carried by one or more than one of the one or more than one resource element available for use in wireless communications between the user equipment and the transmit point and the receiver being further operable to receive one or more than one signal associated with the one or more than one available resource element for such wireless communications.

12. The user equipment of claim 11, wherein the identification data comprises a cell-specific reference signal.

13. An eNB for supporting wireless communications with a user equipment; the eNB comprising:
  a processor comprising processing circuitry to output reservation data or identification data to be carried by a plurality of respective subcarriers;
  a transmitter operable over an unlicensed frequency band, the transmitter to output a plurality of orthogonal frequency division multiplex (OFDM) symbols bearing respective pluralities of resource elements; wherein each of the plurality of OFDM symbols bears at least one resource element of a plurality of resource elements that convey the reservation data or identification data to reserve at least a portion of the unlicensed frequency band for supporting a wireless communication between the eNB and the user equipment; the plurality of OFDM symbols also bearing a plurality of available resource elements for use in supporting wireless communication between the eNB and the user equipment, wherein resource elements transmitted by adjacent OFDM symbols are transmitted on adjacent subcarriers.

14. The eNB of claim 13, further comprising an antenna to output the plurality of OFDM symbols.

15. A method of wireless communication; the method comprising:
  generating identification data associated with a transmit point;
  producing a discovery signal for transmission over an unlicensed spectrum, the discovery signal comprising a number of resource elements distributed over a plurality of symbols of a resource block, wherein at least one resource element of the number of resource elements is to be carried by each symbol; at least one resource element bearing the identification data associated with a transmit point, the discovery signal also bearing one or more than one further resource element associated with the at least one resource element bearing identification data associated with the transmit point; the one or more than one further resource element being available for wireless communications with the transmit point;
  wirelessly transmitting the discovery signal over the unlicensed spectrum, wherein individual resource elements transmitted by adjacent symbols are transmitted on adjacent sub carriers.

16. The method of claim 15, wherein producing the discovery signal comprises determining which resource elements of the discovery signal are unoccupied resource elements and ensuring that at least one resource element of associated resource elements of a respective symbol comprising the unoccupied resource elements additionally comprises at least one occupied resource element.

17. The method of claim 15, wherein producing the discovery signal comprises populating at least one resource element of at least a plurality of symbols having respective resource elements with at least one respective subcarrier.

18. The method of claim 17, wherein the at least one respective subcarrier conveys the identification data.

* * * * *